(12) United States Patent
Oguchi

(10) Patent No.: US 8,953,484 B2
(45) Date of Patent: Feb. 10, 2015

(54) COMMUNICATION DEVICE AND COMMUNICATION METHOD

(71) Applicant: Fujitsu Limited, Kawasaki-shi, Kanagawa (JP)

(72) Inventor: Naoki Oguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 225 days.

(21) Appl. No.: 13/720,515

(22) Filed: Dec. 19, 2012

(65) Prior Publication Data

US 2013/0163455 A1 Jun. 27, 2013

(30) Foreign Application Priority Data

Dec. 21, 2011 (JP) ................................. 2011-280590

(51) Int. Cl.
*H04L 12/26* (2006.01)
*H04W 24/02* (2009.01)
*H04L 1/18* (2006.01)

(52) U.S. Cl.
CPC *H04W 24/02* (2013.01); *H04L 1/18* (2013.01)
USPC .......................................... 370/252; 370/328

(58) Field of Classification Search
None
See application file for complete search history.

(56) References Cited

U.S. PATENT DOCUMENTS

| | | | |
|---|---|---|---|
| 5,844,918 A * | 12/1998 | Kato ............................. | 714/751 |
| 2003/0126238 A1 * | 7/2003 | Kohno et al. ................. | 709/220 |
| 2003/0179580 A1 | 9/2003 | Ito et al. | |
| 2005/0050424 A1 * | 3/2005 | Matsuura ...................... | 714/748 |
| 2005/0154965 A1 * | 7/2005 | Ichiki et al. .................. | 714/776 |
| 2005/0182850 A1 * | 8/2005 | Kohno .......................... | 709/236 |
| 2005/0207406 A1 * | 9/2005 | Reme ............................ | 370/389 |
| 2005/0289395 A1 * | 12/2005 | Katsuyama et al. ........... | 714/25 |
| 2007/0277072 A1 * | 11/2007 | Schaap et al. ................. | 714/748 |
| 2008/0109693 A1 * | 5/2008 | Maas et al. .................... | 714/748 |
| 2009/0268613 A1 * | 10/2009 | Sagfors ........................ | 370/235 |
| 2009/0300453 A1 | 12/2009 | Sahara | |
| 2010/0250770 A1 * | 9/2010 | Barreto et al. ................ | 709/231 |
| 2010/0281322 A1 * | 11/2010 | Park et al. ..................... | 714/748 |
| 2014/0153637 A1 * | 6/2014 | Imai et al. ............... | 375/240.02 |
| 2014/0219230 A1 * | 8/2014 | Schierl et al. ................. | 370/329 |
| 2014/0241243 A1 * | 8/2014 | Singh et al. ................... | 370/328 |

FOREIGN PATENT DOCUMENTS

JP 2003-179580 A 6/2003
JP 2009-290393 A 12/2009

* cited by examiner

*Primary Examiner* — Otis L Thompson, Jr.
(74) *Attorney, Agent, or Firm* — Arent Fox LLP

(57) ABSTRACT

A communication device including: a processor configured to perform a wireless communication protocol including an upper layer and a lower layer, wherein the processor is configured to estimate, based on a round trip time measured at the upper layer in case of carrying out a retransmission control at the lower layer and a time taking for retransmissions at the lower layer, a first estimated round trip time, to estimate, based on the number of times of packet loss at the upper layer in case of carrying out the retransmission control at the lower layer, and the number of times of successful transmission at the upper layer being recovered by the retransmission control, a first estimated packet loss rate, and to obtain, based on the first estimated round trip time and the first estimated packet loss rate, a first estimated throughput in case of not carrying out the retransmission control.

13 Claims, 27 Drawing Sheets

FIG. 13A

| FIELD | SIZE | REMARKS |
|---|---|---|
| MANAGEMENT MESSAGE TYPE | 1 | =11 (FIXED) |
| TRANSACTION ID | 2 | |
| UL/DL ENCODING | 17 (TLV) | UL=145,DL=146 |
| QoS PARAMETER SET TYPE TLV | 3 (TLV) | SETTING OF QoS TO REQUEST SERVICE FLOW |
| ARQ ENABLE TLV | 4 (TLV) | 0=ARQ OFF,1=ARQ ON |
| ARQ_WINDOW_SIZE TLV | 4 (TLV) | NUMBER OF ARQ BLOCKS THAT CAN BE CONSECUTIVELY TRANSMITTED BEFORE RECEIVING ACK USING ARQ |
| ARQ_RETRY_TIMEOUT TLV | 4 (TLV) | DELAY TIME USED FOR TRANSMISSION PROCESSING OF THE DEVICE WHICH TRANSMITTED DSA-REQ. THE TRANSMISSION DEVICE SETS TOTAL OF ARQ_RETRY_TIMEOUT TLV (DELAY TIME USED FOR RECEPTION PROCESSING OF RECEPTION DEVICE) OF RECEPTION DEVICE WHICH TRANSMITTED DSA-RSP, AS ARQ TIMEOUT TIME. |

FIG. 13B

| FIELD | SIZE | REMARKS |
|---|---|---|
| MANAGEMENT MESSAGE TYPE | 1 | =12 (FIXED) |
| TRANSACTION ID | 2 | |
| UL/DL ENCODING | 22 (TLV) | UL=145,DL=146 |
| SFID TLV | 5 (TLV) | IDENTIFIER (ID) AS TO SERVICE FLOW. BS OUTPUTS THIS IN RESPONSE TO DSA-REQ FROM WIRELESS TERMINAL. SERVICE FLOW DISTINGUISHES COMMUNICATION SESSION BETWEEN WIRELESS TERMINAL AND WIRELESS ACCESS NETWORK. |
| CID TLV | 4 | IDENTIFIER TO DISTINGUISH COMMUNICATION SESSION BETWEEN WIRELESS BASE STATION AND WIRELESS TERMINAL. CID CORRESPONDS ONE-ON-ONE WITH SFID AS LONG AS WIRELESS TERMINAL IS CONNECTED TO PARTICULAR WIRELESS BASE STATION. |
| QoS PARAMETER SET TYPE TLV | 3 (TLV) | SETTING OF QoS TO REQUEST SERVICE FLOW |
| ARQ ENABLE TLV | 4 (TLV) | 0=ARQ OFF,1=ARQ ON |
| ARQ_WINDOW_SIZE TLV | 4 (TLV) | NUMBER OF ARQ BLOCKS THAT CAN BE CONSECUTIVELY TRANSMITTED BEFORE RECEIVING ACK USING ARQ |
| ARQ_RETRY_TIMEOUT TLV | 4 (TLV) | DELAY TIME USED FOR TRANSMISSION PROCESSING OF THE DEVICE WHICH TRANSMITTED DSA-REQ. THE TRANSMISSION DEVICE SETS TOTAL OF ARQ_RETRY_TIMEOUT TLV (DELAY TIME USED FOR RECEPTION PROCESSING OF RECEPTION DEVICE) OF RECEPTION DEVICE WHICH TRANSMITTED DSA-RSP, AS ARQ TIMEOUT TIME. |

FIG. 13C

| FIELD | SIZE | REMARKS |
|---|---|---|
| MANAGEMENT MESSAGE TYPE | 1 | =13 (FIXED) |
| TRANSACTION ID | 2 | |
| CONFIRMATION CODE | 1 | 0:OK/SUCCESS,1-17:REJECT |

FIG. 14A

| FIELD | SIZE | REMARKS |
|---|---|---|
| MANAGEMENT MESSAGE TYPE | 1 | =14 (FIXED) |
| TRANSACTION ID | 2 | |
| UL/DL ENCODING | 18 (TLV) | UL=145, DL=146 |
| CID TLV | 4 (TLV) | SPECIFY CID TO BE CHANGED |
| ARQ ENABLE TLV | 4 (TLV) | SPECIFY CHANGE CONTENTS REGARDING ARQ<br>0 = ARQ OFF (IN THE CASE OF OFF, FOLLOWING TLVS MAY BE OMITTED)<br>1 = ARQ ON |
| ARQ_WINDOW_SIZE TLV | 4 (TLV) | NUMBER OF ARQ BLOCKS THAT CAN BE CONSECUTIVELY TRANSMITTED BEFORE RECEIVING ACK USING ARQ |
| ARQ_RETRY_TIMEOUT TLV | 4 (TLV) | DELAY TIME USED FOR TRANSMISSION PROCESSING OF THE DEVICE WHICH TRANSMITTED DSA-REQ. THE TRANSMISSION DEVICE SETS TOTAL OF ARQ_RETRY_TIMEOUT TLV (DELAY TIME USED FOR RECEPTION PROCESSING OF RECEPTION DEVICE) OF RECEPTION DEVICE WHICH TRANSMITTED DSA-RSP, AS ARQ TIMEOUT TIME. |

FIG. 14B

| FIELD | SIZE | REMARKS |
|---|---|---|
| MANAGEMENT MESSAGE TYPE | 1 | =15 (FIXED) |
| TRANSACTION ID | 2 | |
| UL/DL ENCODING | 18 (TLV) | UL=145,DL=146 |
| CID TLV | 4 (TLV) | SPECIFY CID TO BE CHANGED |
| ARQ ENABLE TLV | 4 (TLV) | SPECIFY CHANGE CONTENTS REGARDING ARQ 0 = ARQ OFF (IN THE CASE OF OFF, FOLLOWING TLVS MAY BE OMITTED) 1 = ARQ ON IN THE CASE OF DSC-RSP, IN THE EVENT THAT WIRELESS BASE STATION HAS CONFIRMED THE VALUE REQUESTED IN REQ, RESPOND THE VALUE REQUESTED IN REQ |
| ARQ_WINDOW_SIZE TLV | 4 (TLV) | NUMBER OF ARQ BLOCKS THAT CAN BE CONSECUTIVELY TRANSMITTED BEFORE RECEIVING ACK USING ARQ. IN THE CASE OF DSC-RSP, IN THE EVENT THAT WIRELESS BASE STATION HAS CONFIRMED THE VALUE REQUESTED IN REQ, RESPOND THE VALUE REQUESTED IN REQ. |
| ARQ_RETRY_TIMEOUT TLV | 4 (TLV) | DELAY TIME USED FOR TRANSMISSION PROCESSING OF THE DEVICE WHICH TRANSMITTED DSA-REQ. THE TRANSMISSION DEVICE SETS TOTAL OF ARQ_RETRY_TIMEOUT TLV (DELAY TIME USED FOR RECEPTION PROCESSING OF RECEPTION DEVICE) OF RECEPTION DEVICE WHICH TRANSMITTED DSA-RSP, AS ARQ TIMEOUT TIME. |

FIG. 14C

| FIELD | SIZE | REMARKS |
|---|---|---|
| MANAGEMENT MESSAGE TYPE | 1 | =16 (FIXED) |
| TRANSACTION ID | 2 | |
| CONFIRMATION CODE | 1 | 0:OK/SUCCESS,1-17:REJECT |

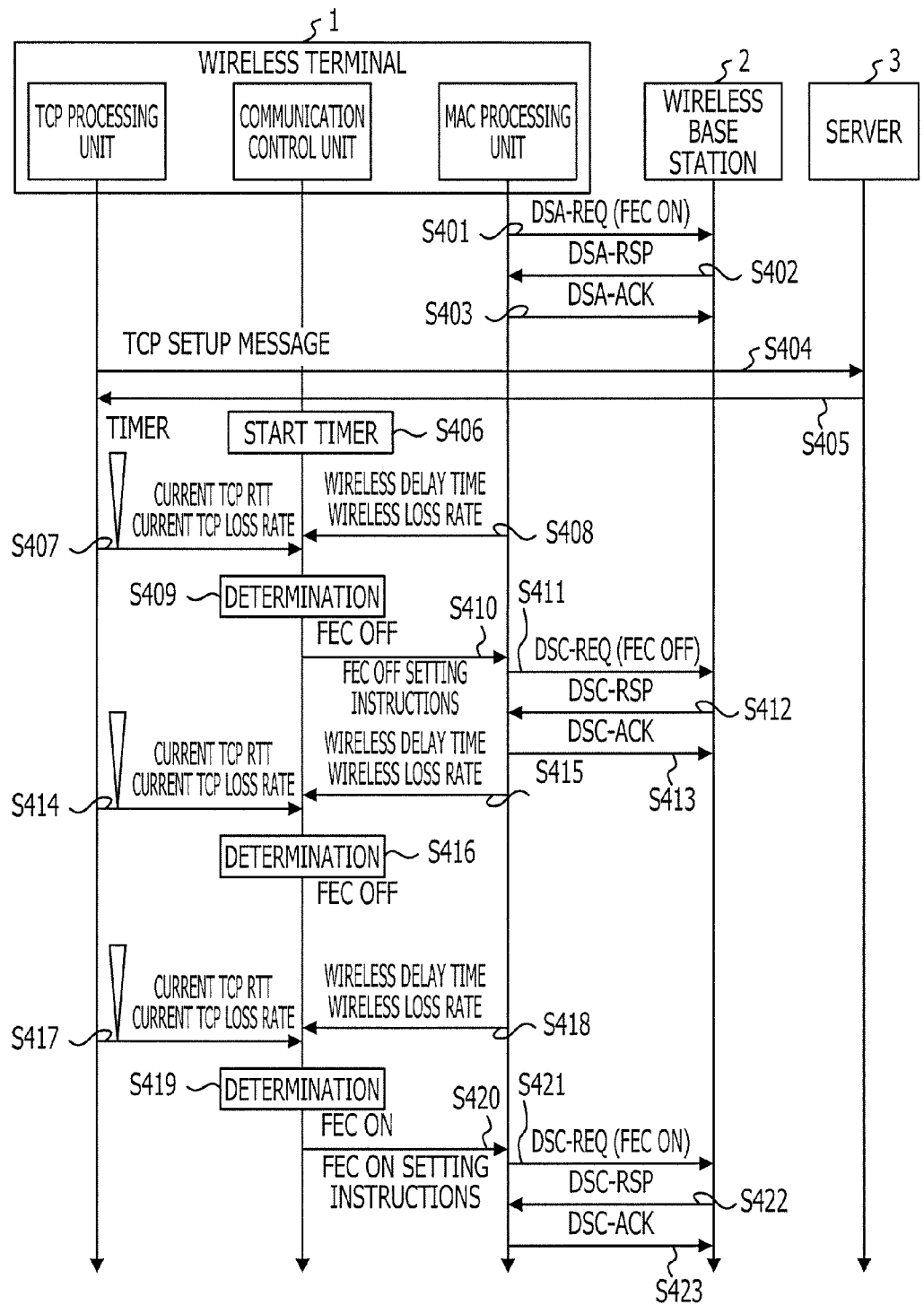

FIG. 20

| FIELD | SIZE | RECITAL |
|---|---|---|
| FEC ENABLE TLV | 4(TLV) | SPECIFY CHANGE CONTENTS REGARDING FEC<br>0 = FEC OFF (IN THE CASE OF OFF, FOLLOWING TLVS MAY BE OMITTED)<br>1 = FEC ON<br>IN THE CASE OF DSC-RSP, IN THE EVENT THAT WIRELESS BASE STATION HAS CONFIRMED THE VALUE REQUESTED IN REQ, RESPOND THE VALUE REQUESTED IN REQ. |
| FEC_ENCODE_PARAM TLV | 4 (TLV) | SPECIFY ENCODING RATE IN FEC FUNCTION. WIRELESS TERMINAL AND WIRELESS BASE STATION HAVE PRESET VALUE FOR ENCODING RATE BEFOREHAND AND SPECIFY THE PRESET VALUE.<br>0x0=188/188<br>0x1=188/204<br>0x2=188/220<br>0x3=188/236<br>0x4=188/252<br>0x5=188/268 |

FIG. 22

|  |  | AVERAGE MSS (BYTES) | CORRECTABLE PACKET LOSS RATE |
|---|---|---|---|
| FEC ENCODING RATE (DATA LENGTH / CODE LENGTH) | $E_{L0}=188/188$ | 1460 | $P_{L0}=0\%$ |
| | $E_{L1}=188/204$ | 1345 | $P_{L1}=0.0001\%$ |
| | $E_{L2}=188/220$ | 1247 | $P_{L2}=0.0008\%$ |
| | $E_{L3}=188/236$ | 1163 | $P_{L3}=0.0013\%$ |
| | $E_{L4}=188/252$ | 1089 | $P_{L4}=0.009\%$ |
| | $E_{L5}=188/268$ | 1024 | $P_{L5}=0.03\%$ |

FIG. 23

| COMMUNICATION APLICATION | PORT NUMBER | TIMER EXPIRATION TIME (SECONDS) |
|---|---|---|
| FTP DATA | 20 | 10 |
| http | 80 | 2 |

COMMUNICATION DEVICE AND COMMUNICATION METHOD

CROSS-REFERENCE TO RELATED APPLICATION

This application is based upon and claims the benefit of priority of the prior Japanese Patent Application No. 2011-280590, filed on Dec. 21, 2011, the entire contents of which are incorporated herein by reference.

FIELD

The embodiments discussed herein are related to a communication device and a communication method.

BACKGROUND

Data communication over wireless lines has come to be performed frequently. With an existing so-called third generation mobile communication system or 3.5th generation mobile communication system as well, data communication has come to be widely used with application use such as e-mail, web browsing, or the like. In recent years, service providing of a so-called 3.9th generation mobile communication system higher than those existing systems has been started, and also service of a further higher speed fourth generation mobile communication system is also planned to be started. Also, widespread use of smartphones has led to increase in wireless data communication. Under such a situation, data communication over wireless lines is expected to increase more and more in the future, and the importance thereof is increasing more and more.

In general, with wireless communication, as compared to wired communication, signal error readily occurs due to interference of radio waves or the like. Therefore, with wireless communication, a technique to enhance communication reliability has been employed, such as ARQ (Automatic Repeat reQuest) or FEC (Forward Error Correction).

ARQ is a technique to enhance reliability of wireless communication by performing retransmission in the event that a wireless frame is not correctly received. First, a transmission device transmits a wireless frame. In the event of having correctly received the wireless frame (in the event of having received the wireless frame and also having no reception error in the received wireless frames), a reception device responds with an ACK (ACKnowledge: reception acknowledgement) signal to the transmission device. In the event of having received no ACK signal from the reception device, the transmission device performs retransmission of the wireless frame after waiting for timeout.

The transmission device repeats this operation until the transmission device receives an ACK signal. The upper limit of the number of times of repeating this operation is called "the maximum number of times of retransmission", which is one parameter of retransmission control. In the event of having received an ACK signal within the maximum number of times of retransmission, this means to have succeeded at transmission of the wireless frame using retransmission control. Also, in the event of having received no ACK signal after performing retransmission by the maximum number of times of retransmission, the transmission device ends retransmission control. This case means to have failed in transmission of the wireless frame. The greater the maximum number of times of retransmission is, the higher a probability to succeed in transmission of the wireless frame increases, and the smaller the maximum number of times of retransmission is, the lower a probability to succeed in transmission of the wireless frame decreases. Even in the event that it is difficult to correctly receive the wireless frame due to deterioration in wireless quality, communication reliability with a wireless line is secured by employing ARQ.

On the other hand, FEC is a technique to transmit redundant data generated from transmission data by loading on the wireless frame beforehand, and to restore, in the event that there is a transmission error, data including an error from the redundant data. The redundant data may be loaded on the same wireless frame as the transmission data, or may be loaded on a frame different from the transmission data. Also, there may be a plurality of redundant data, and in this case, the redundant data is distributed and loaded on multiple frames.

With FEC, basically, retransmission such as ARQ does not to be performed (however, there is an exception in the event of combining FEC and ARQ, which will be described later). With FEC, redundant data is used, and accordingly, though there is an aspect where efficiency in data transmission decreases, retransmission does not have to be performed, whereby data transmission may effectively be performed instead in the event that wireless quality is deteriorated, or the like. That is to say, even in the event that frames are readily damaged due to deterioration in wireless quality, reliability of communication with a wireless line is secured by employing FEC.

ARQ and FEC both have in common being techniques to enhance reliability of communication. Therefore, frequently, just one thereof is employed. In general, ARQ is adapted to a network with small transmission delay, and FEC is adapted to a network with great transmission delay. However, these are not necessarily selective techniques, and both may also be employed together. Examples of a technique to employ both together include HARQ (Hybrid ARQ).

Also, there has been popular a technique to carry out ARQ and FEC by switching at a wireless layer according to RTT (Round Trip Time: round-trip delay time) at an upper layer which is a wireless layer, as the related art.

Japanese Laid-open Patent Publication Nos. 2009-290393 and 2003-179580 are examples of the related art of the present technology.

SUMMARY

According to an aspect of the invention, a communication device includes an antenna configured to perform a wireless communication, and a processor configured to perform a wireless communication protocol for the wireless communication, the wireless communication protocol including an upper layer and a lower layer, wherein the processor is configured to estimate, based on a round trip time measured at the upper layer in case of carrying out a retransmission control at the lower layer and a time taking for retransmissions at the lower layer, a first estimated round trip time in case of not carrying out the retransmission control, to estimate, based on the number of times of packet loss at the upper layer in case of carrying out the retransmission control at the lower layer, and the number of times of successful transmission at the upper layer being recovered by the retransmission control, a first estimated packet loss rate in case of not carrying out the retransmission control, and to obtain, based on the first estimated round trip time and the first estimated packet loss rate, a first estimated throughput in case of not carrying out the retransmission control.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 13A to 13C indicate control messages in the communication system according to the first embodiment.

FIGS. 14A to 14C indicate control messages in the communication system according to the first embodiment.

FIG. 19 illustrates an operation sequence in the communication system according to the third embodiment.

FIG. 20 illustrates control messages in the communication system according to the third embodiment.

FIG. 22 indicates encoding rates that may be employed in FEC.

FIG. 23 indicates a timer table.

DESCRIPTION OF EMBODIMENTS

Figure 1:
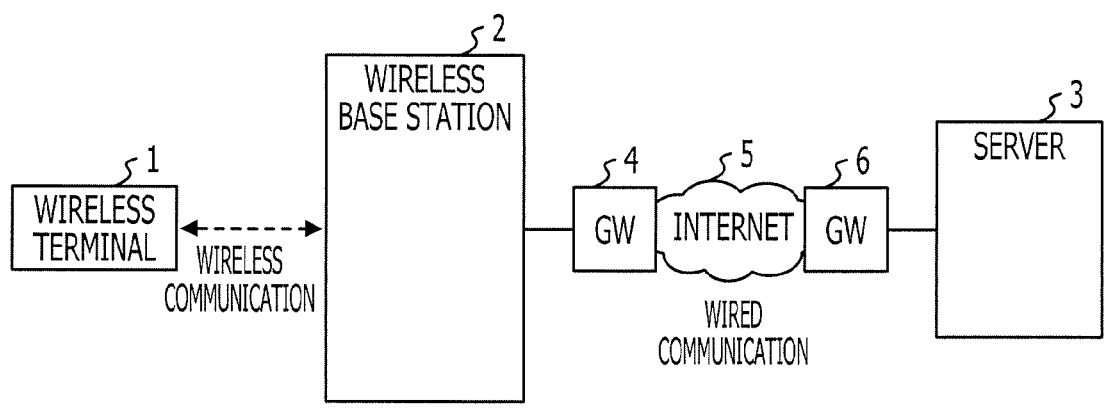
FIG. 1 illustrates a network configuration of a communication system according to a first embodiment.

On the other hand, with data communication, TCP/IP (Transmission Control Protocol/Internet Protocol) which is a standard protocol of the Internet is generally employed between the data link layer and application layer. With wireless data communication as well, TCP/IP is employed at an upper layer of wireless layers (physical layer to data link layer) which are lower layers. IP is an upper protocol of wireless layers, and has a function to transmit packets end-to-end (from transmission source to transmission destination), and so forth. TCP is an upper protocol of IP, and has a function to secure reliability with end-to-end, or the like.

Here, with communication, in general, securing of communication efficiency, i.e., throughput is important. Throughput is periodically measured, and in the event that throughput is lower than the assumption, or the like, communication carriers attempt to secure fixed throughput according to some measures. Though throughput is determined according to many factors, throughput is formulated with several parameters under given conditions. In general, throughput of TCP is expressed with Expression (1).

[Numeric Expression 1]

$$R = \frac{B}{RTT} \frac{\alpha}{P} \quad (1)$$

B: PACKET DATA SIZE
RTT: ROUND-TRIP TIME
P: PACKET LOSS RATE
α: TCP-SPECIFIC PARAMETER

With Expression (1), B is equivalent to a data size that can be transmitted with one TCP packet. RTT is time taken for the transmission device transmitting a packet and receiving a reply packet thereof from the reception device. P is a packet loss rate, which is a ratio of receiving a reply packet thereof from the reception device as to a case where the transmission device transmitted a packet. α is a TCP-specific parameter, and is a constant determined according to implementation of TCP.

Now, in the event of carrying out ARQ at a wireless layer, retransmission is performed, and accordingly, RTT at the TCP layer increases in length as compared to a case where ARQ has not been implemented. On the other hand, in the event of having implemented ARQ, a packet loss rate P at the TCP layer decreases as compared to a case where ARQ has not been implemented. Specifically, in the event of stopping ARQ, the denominator of the right side in Expression (1) may increase or may decrease. On the other hand, the numerator of the right side in Expression (1) is not changed. Accordingly, whether to obtain higher throughput in which case of a case where ARQ has been implemented and a case where ARQ has not been implemented depends on a case-by-case basis.

Also, the same as with ARQ may be applied to FEC. In the event that FEC is carried out at a wireless layer, redundant data is employed, and accordingly, as compared to a case where FEC is not carried out, B becomes small. On the other hand, in the event that FEC is carried out, as compared to a case where FEC has not been implemented, the packet loss rate P at the TCP layer becomes small. Specifically, in the event of stopping FEC, the numerator and denominator of the right side in Expression (1) both become small. Accordingly, whether to obtain higher throughput in which case of a case where FEC has been implemented and a case where FEC has not been implemented also depends on a case-by-case basis.

Therefore, for example, in the event that ARQ is carried out at a wireless layer, and throughput is low, the throughput of TCP may be improved by stopping ARQ, but may further be deteriorated. Conversely, in the event that ARQ is stopped at a wireless layer, and throughput is low, the throughput of TCP may be improved by carrying out ARQ, but may further be deteriorated. This problem is not restricted to ARQ, and is also true regarding FEC.

Accordingly, for example, in the event that ARQ is carried out at a wireless layer, whether to improve the throughput of TCP by stopping ARQ is not found by actually stopping ARQ. Also, fixed time is required to accurately measure throughput. Therefore, in the event that the throughput of TCP is deteriorated while carrying out ARQ, though throughput is measured for fixed time by stopping ARQ, when it is found that throughput is further deteriorated, ARQ may be resumed. In this case, it is not desirable that the network is operated with needlessly low throughput for a period while ARQ is stopped. In the event of carrying out ARQ being stopped, the same problem as this also occurs on FEC.

Also, with the above technique according to the related art, attention is paid to only the size of RU at an upper layer. Therefore, it is not found unless ARQ and FEC are actually switched whether to improve throughput at the upper layer in the event of having switched ARQ and FEC at a wireless layer (or in the event having switched on/off of ARQ). That is to say, the above problem is not solved with the technique according to the related art.

The communication device and communication method according to the present disclosure have been made in the light of such a point, which are provided to obtain throughput at the time of stopping of retransmission control without stopping retransmission control while carrying out retransmission control.

Hereafter, description will be made regarding embodiments of the communication device and communication method according to the present disclosure, with reference to the drawings. Note that, though description will be made as separate embodiments for convenience, it goes without saying that a combined advantage is obtained by combining the embodiments, and accordingly, the usefulness may further be enhanced.

[a] First Embodiment

FIG. 1 illustrates an overall network configuration of a communication system according to a first embodiment. With the first embodiment, let us say that a wireless terminal 1 is performing data communication with a server 3 in a data center or the like. The wireless terminal 1 performs wireless communication with a wireless base station 2. The wireless base station 2 performs communication with the server 3 by wire via a gateway 4 on the wireless carrier side, Internet 5, and a gate way 6 on the server 3 side, and so forth. However, wireless communication may be performed with a part or all of between the wireless base station 2 and server 3.

With the first embodiment, WiMAX is assumed to be employed as a wireless communication technique. Therefore, WiMAX-specific terms and concepts will appear. However, the first embodiment is just an example, and it has to be noted that the present technology may be applied to wireless communication methods other than WiMAX.

Figure 2:
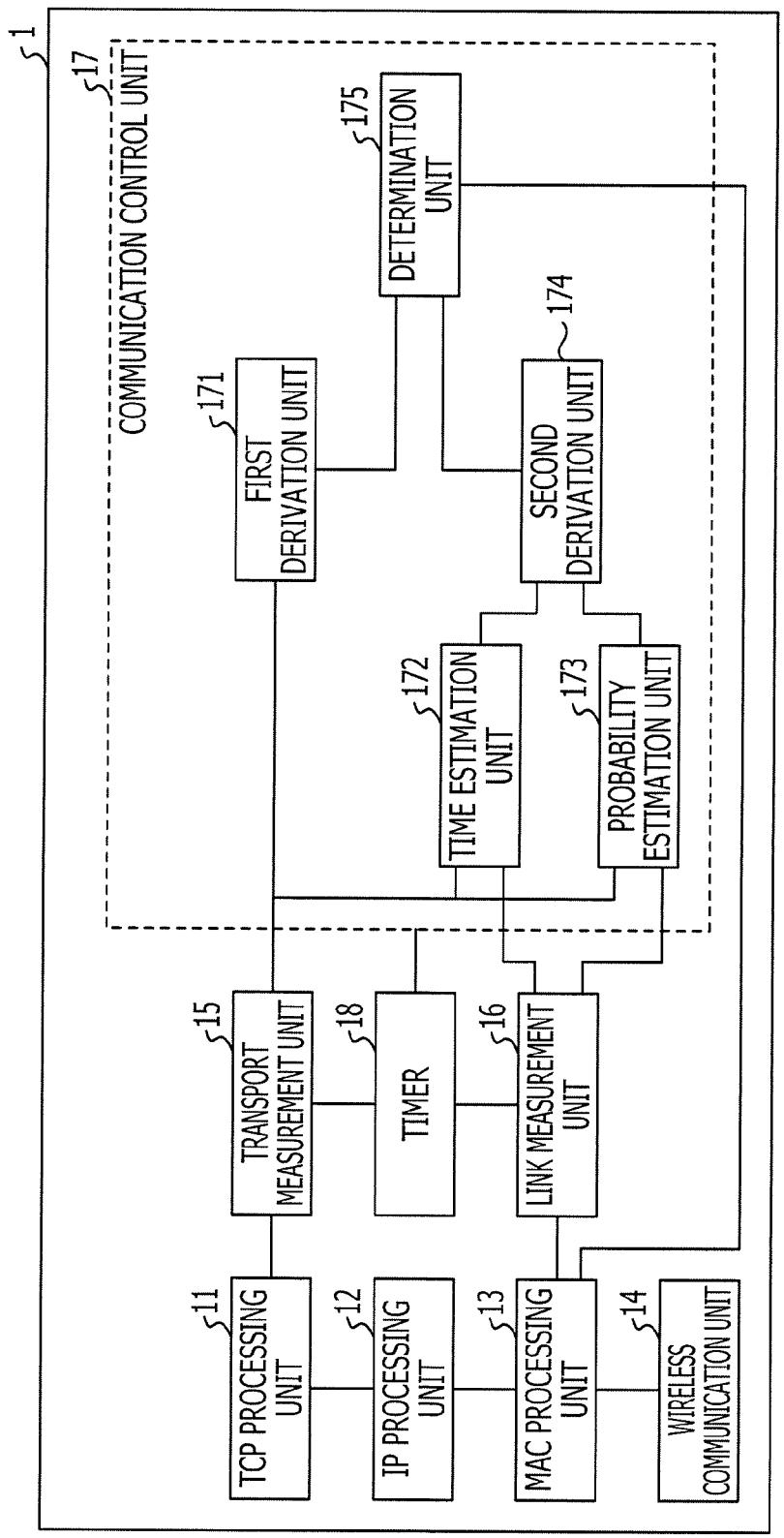
FIG. 2 illustrates a function configuration of a wireless terminal in the communication system according to the first embodiment.

FIG. 2 illustrates a function configuration of the wireless terminal 1 according to the first embodiment. The wireless terminal 1 includes a TCP processing unit 11, an IP processing unit 12, a MAC processing unit 13, a wireless communication unit 14, a transport measurement unit 15, a link measurement unit 16, a communication control unit 17, and a timer 18. Further, the communication control unit 17 includes a first derivation unit 171, a time estimation unit 172, a probability estimation unit 173, a second derivation unit 174, and a determination unit 175.

Next, description will be made regarding processing to transmit/receive data between the wireless terminal 1 and server 3 based on TCP. This corresponds to description of the TCP processing unit 11, IP processing unit 12, MAC processing unit 13, and wireless communication unit 14. Note that this processing itself is common, and is not a present application-specific configuration.

In the event of having received transmission data from an application, TCP processing unit 11 of the wireless terminal 1 creates a TCP packet by adding a TCP header to the transmission data, or the like. The TCP header includes a sequence number to identify a TCP packet. The TCP processing unit 11 outputs the TCP packet to the IP processing unit 12. The IP processing unit 12 creates an IP packet by adding an IP header to the TCP packet or the like. The IP processing unit 12 outputs the IP packet to the MAC processing unit 13. The MAC processing unit 13 creates a wireless frame by adding an MAC header to the IP packet, or the like. The MAC processing unit 13 outputs the wireless frame to the wireless communication unit 14. The wireless communication unit 14 performs modulation of carrier waves based on information within the wireless frame, converts the modulated carrier waves into a wireless signal (radio waves) having a given center frequency, and transmits this. In this way, the transmission data is transmitted with the wireless signal.

The wireless signal is received by the wireless base station 2, and the IP packet (including the TCP packet) included in the wireless signal is arrived at the server 3 via the network. With TCP communication, the server 3 which received the TCP packet including the transmission data sends back a TCP packet in response thereto. With the TCP packet at the time of reply, an ACK flag (it has to be noted that this is a concept different from the ACK signal in ARQ of wireless communication) in the TCP header is set to 1. Therefore, hereinafter, a TCP packet at the time of reply may be referred to as ACK packet. Also, a TCP packet at the time of reply includes an acknowledgement number (accurately, the sequence number+1 of the received TCP packet is set) to identify the sequence number of a received TCP packet. A TCP packet at the time of reply may include replay data or may not. The IP packet including the TCP packet to which the server 3 has responded is arrived at the wireless base station 2 via the network. The wireless base station 2 transmits the wireless signal based on the TCP packet at the time of reply to the wireless terminal 1.

The wireless terminal 1 is assumed to have received the wireless signal based on a TCP packet including replay data. The wireless communication unit 14 of the wireless terminal 1 demodulates the received wireless signal to obtain a wireless frame. The wireless communication unit 14 outputs the wireless frame to the MAC processing unit 13. The MAC processing unit 13 obtains the IP packet by removing the MAC header from the wireless frame, or the like. The MAC processing unit 13 outputs the IP packet to the IP processing unit 12. The IP processing unit 12 obtains the TCP packet by removing the IP header from the IP packet, or the like. The IP processing unit 12 outputs the TCP packet to the TCP processing unit 11. The TCP processing unit 11 obtains reply data by removing the TCP header from the TCP packet, or the like. At this time, the TCP processing unit 11 confirms that the ACK flag within the TCP header is set to 1, and that the acknowledgement number is the sequence number+1 of the previously transmitted TCP packet. According to this confirmation, the TCP processing unit 11 confirms that transmission of the TCP packet including the transmission data has succeeded (the TCP packet including the transmission data has been received by the server 3). Finally, the TCP processing unit 11 outputs the received data to the application.

Description that has been made so far is regarding the processing for the wireless terminal 1 transmitting/receiving data to/from the server 3 based on TCP.

The MAC processing unit 13 also performs various types of control in wireless communication. For example, the MAC processing unit 13 performs service flow management. The MAC processing unit 13 provides one or multiple service flows between the wireless terminal 1 and wireless base station 2. The MAC processing unit 13 may provide a service flow for each application, or cause multiple applications to share a service flow. Note that as service flows of WiMAX there are two types of service flows for control and for data. TCP communication is performed via a data service flow. One control service flow is necessarily provided between the wireless terminal 1 and wireless base station 2.

Also, the MAC processing unit 13 performs transmission/reception of various control messages regarding wireless communication. The control messages are transmitted/received via the control service flow. The control messages will be described later.

Further, the MAC processing unit 13 carries out ARQ control to reliability in wireless communication.

In the event of having received no ACK signal corresponding to a transmitted wireless frame, the MAC processing unit 13 performs retransmission of the wireless frame after waiting for timeout. Also, in the event of having received a NACK (Negative ACKnowledge) signal which is a control signal indicating that the wireless frame has not correctly been received, the MAC processing unit 13 performs retransmission of the wireless frame. The MAC processing unit 13 repeats this operation until an ACK signal is received. The upper limit of the number of times of repeating of this operation is referred to as "the maximum number of times of retransmission", which is one parameter of retransmission control. In the event of having been able to receive an ACK with retransmission within the maximum number of times of retransmission, this means that transmission of the wireless frame has succeeded using retransmission control. Also, in the event of having not been able to receive an ACK signal even after performing retransmission by the maximum number of times of retransmission, the transmission device ends retransmission control, which means that transmission of the wireless frame has failed. The greater the maximum number of times of retransmission is, the higher a probability for transmission of the wireless frame succeeding is, and on the other hand, the smaller the maximum number of times of retransmission is, the lower a probability for transmission of the wireless frame succeeding is. Even in the event that a frame is readily damaged due to deterioration in wireless quality, reliability of communication over a wireless line is secured by employing ARQ.

The MAC processing unit 13 has a function to turn on/off ARQ control. In the event that ARQ control is on, the above-mentioned ARQ control is carried out. In the event that ARQ control is off, the ARQ control is not carried out. Also, on/off of ARQ control may be set for each service flow. However, with the control service flow for WiMAX, ARQ control is consistently set to on.

Also, the TCP processing unit 11 has a function for retransmission of TCP packets. Retransmission according to the TCP processing unit 11 is to enhance accessibility of TCP packets at end-to-end (in this case, between the wireless terminal 1 and server 3) different from ARQ in wireless communication. The TCP processing unit 11 performs retransmission in the event that transmission of a TCP packet has failed. There are two cases in transmission failure of a TCP packet. The first case is a case where since the TCP processing unit 11 transmitted a TCP packet including transmission data, the TCP processing unit 11 has not received an ACK packet in response thereto for a certain period of time. The first case will be referred to as RTO (Retransmission Time Out). The second case is a case where a given number of ACK packets with the same response confirmation number have been received. The second case also occurs in the event that there has been a TCP packet which has not been received at the reception device. The second case is caused by TCP window control, and details will be omitted. The second case will be referred to as duplicated ACK reception.

Description will return to FIG. 2. The timer 18 measures time. After the timer 18 is started, the timer 18 expires when measuring given time.

The transport measurement unit 15 monitors a TCP packet to measure TCP quality information regarding the quality of TCP communication. The details of the transport measurement unit 15 will be described later.

The link measurement unit 16 monitors a wireless frame to measure wireless quality information regarding the quality of wireless communication. Details of the link measurement unit 16 will be described later.

The communication control unit 17 obtains TCP throughput, and determines necessity of ARQ based thereon. The communication control unit 17 performs different processing depending on whether ARQ control of a service flow to perform TCP communication is on or off. In the event that ARQ control is on, the communication control unit 17 obtains, based on the TCP quality information, TCP throughput in the event that ARQ control is on, and also estimates, based on the TCP quality information and wireless quality information, TCP throughput in the event that ARQ control is off. In the event that ARQ control is off, the communication control unit 17 obtains, based on the TCP quality information, TCP throughput in the event that ARQ control is off, and also estimates, based on the TCP quality information and wireless quality information, TCP throughput in the event that ARQ control is on. The communication control unit 17 then determines necessity of ARQ based on the TCP throughput in the event that ARQ control is on, and the TCP throughput in the event that ARQ control is off.

Though description has been made so far is processing outline of communication control unit 17, this will be described below in detail along with the principle of the present disclosure.

First, as preparation for detailed description regarding the communication processing unit, behavior of TCP communication to be performed between the wireless terminal 1 and server 3 will be described based on FIGS. 3 through 5.

First, based on FIG. 3, description will be made regarding a case where ARQ control of a service flow to perform TCP communication is on. At this time, the communication control unit 17 obtains current TCP throughput present_TCP_$TP_{ARQ\_ON}$ ARQ ON for a case where ARQ control is ON. Also, the communication control unit 17 estimates estimated_TCP throughput estimated_TCP_$TP_{ARQ\_OFF}$ in the event that ARQ control is off.

TCP throughput is obtained by Expression (1). Here, B and a in Expression (1) do not vary regardless of on/off of ARQ control. However, RTT and P in Expression (1) vary according to on/off of ARQ control. Therefore, in order to estimate TCP throughput, RTT and P have to be estimated. Hereafter, description will sequentially be made regarding this point.

Figure 3:
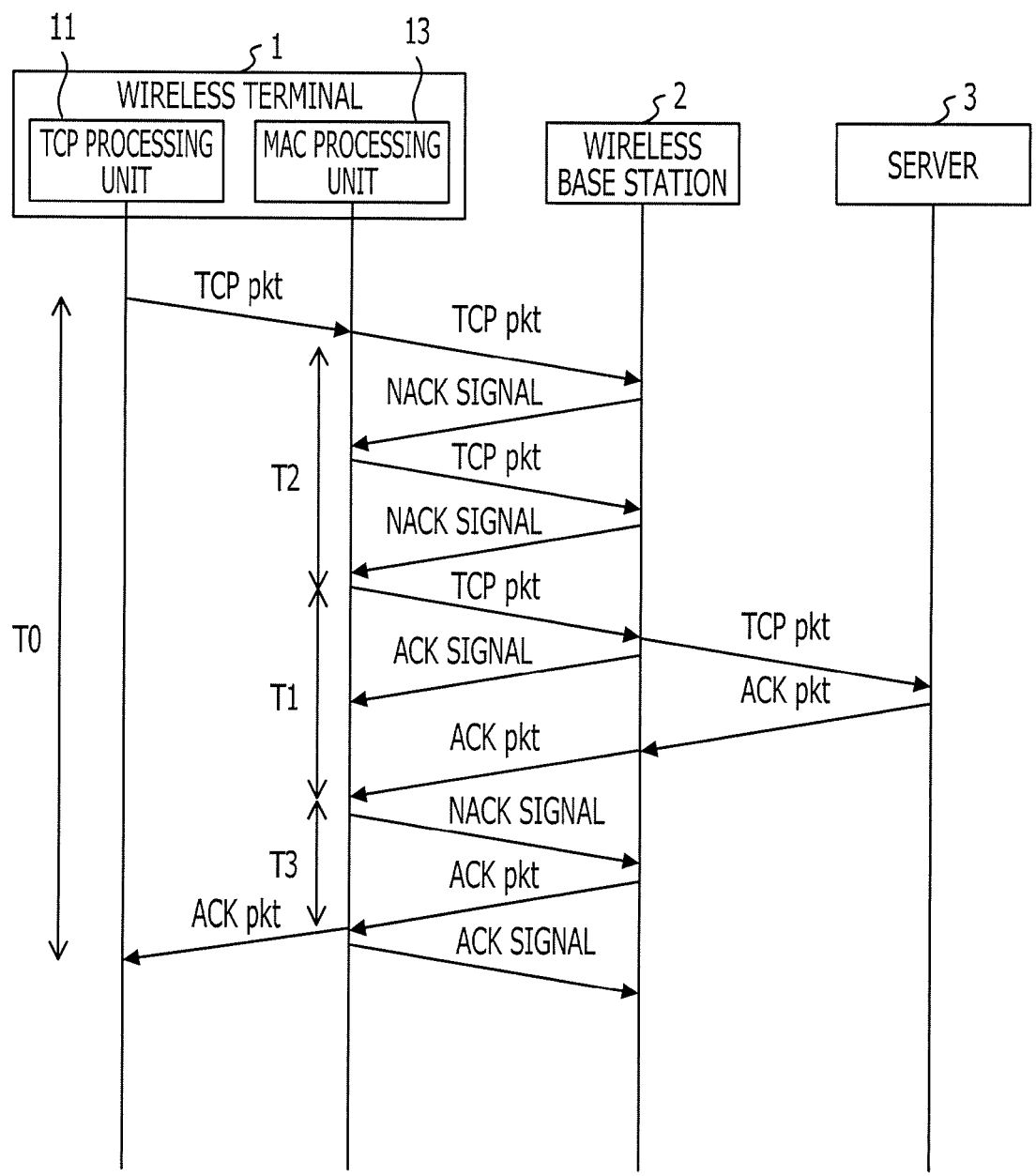
FIG. 3 illustrates behavior in transmission/reception of TCP packets with wireless ARQ control.

FIG. 3 is an example of communication based on TCP packets to be performed between the wireless terminal 1 and server 3. A TCP packet that the wireless terminal 1 transmits to the server 3 is referred to as "TCP pkt". Also, an ACK packet (TCP packet for reply) that the server 3 transmits to the wireless terminal 1 transmits to the server 3 is referred to as "ACK pkt".

In FIG. 3, when the wireless terminal 1 transmits a TCP packet to the server 3, retransmission according to ARQ is performed twice (reception succeeds at the third time including the initial transmission). Also, when the server 3 transmits an ACK packet to the wireless terminal 1, retransmission according to ARQ is performed once (reception succeeds at the second time including the initial transmission).

Now, in order to obtain TCP throughput based on Expression (1), RTT (RTT in TCP, and accordingly, hereafter referred to as TCP RTT) is required. present_TCP_RTT$_{ARQ\ ON}$ which is the current TCP RTT in the event that ARQ is on is time T0 indicated in FIG. 3. Therefore, in order to obtain TCP throughput in the event that ARQ is on, the wireless terminal 1 may obtain present_TCP_RTT$_{ARQ\ ON}$ by measuring T0.

On the other hand, when ARQ is on, estimated_TCP_RTT$_{ARQ\ OFF}$ which is estimated TCP RTT to be estimated in the event of turning off ARQ is estimated to approximate to time T1 indicated in FIG. 3. Therefore, in order to estimate TCP throughput in the event that ARQ is off, T1 has to be measured.

Now, though it goes without saying that the wireless terminal 1 may directly measure T1, this includes a problem. T1 has to be measured by the MAC processing unit 13 which handles the wireless layer. However, in order to measure T1, reception of an ACK packet which is a TCP packet has to be confirmed. Specifically, in order for the wireless terminal 1 to directly measure T1, data at the TCP layer has to be analyzed at the wireless layer (perform processing departed from the wireless layer at the wireless layer). This is not desirable because the processing of the MAC processing unit 13 which handles the wireless layer may be conceived to become very heavy.

Therefore, the wireless terminal 1 may measure T1 in an indirect and also approximate manner as follows. The wireless terminal 1 measures each of T1, T2, and T3 in FIG. 3 to obtain T1=T0−(T2+T3). However, directly measuring T2 and T3 at the MAC processing unit 13 results in a problem in that the processing also becomes heavy.

Therefore, the wireless terminal 1 indirectly measures T2 and T3. If we say that one-time round trip time (referred to as wireless RTT) at the wireless layer is T, it may be conceived that T2 and T3 are expressed with integer multiple of T. Further, average of T2 in a certain period becomes the average number of times of uplink retransmission×T. Also, average of T3 becomes the average number of times of downlink retransmission×T. Here, a direction from the wireless terminal 1 to the wireless base station 2 will be referred to as "uplink", and a direction from the wireless base station 2 to the wireless terminal 1 will be referred to as "downlink". The wireless terminal 1 may obtain the average number of times of retransmission of uplink by measuring the number of times of receiving a NACK signal at the time of transmitting a certain wireless frame. The wireless terminal 1 may obtain the average number of times of retransmission of downlink by measuring the number of times of transmitting a NACK signal at the time of receiving a certain wireless frame. These values are all readily measured at the wireless layer, and accordingly, the wireless terminal 1 may readily obtain T2 and T3.

Accordingly, the wireless terminal 1 may estimate estimated_TCP_RTT$_{ARQ\ OFF}$=T1, which is estimated TCP RTT to be estimated in the event that ARQ is set to off. Here, if we say that T2+T3=Time$_{ARQ\ OFF}$, estimated_TCP_RTT$_{ARQ\ OFF}$ is represented as estimated_TCP_RTT$_{ARQ\ OFF}$=present_TCP_RTT$_{ARQ\ ON}$−Time$_{ARQ\ OFF}$. Briefly speaking, Time$_{ARQ\ OFF}$ corresponds to time used for retransmission according to ARQ control. In other words, if we say that ARQ is set to off, delay time for the worth of Time$_{ARQ\ OFF}$ is removed.

Next, in order to obtain TCP throughput, the packet loss rate P (hereafter, referred to as TCP loss rate) of Expression (1) is required. present_TCP_Loss$_{ARQ\ ON}$ which is the current TCP loss rate in the event that ARQ is on is represented as present_TCP_Loss$_{ARQ\ ON}$=L1/S. Here, S is the number of times for the TCP processing unit 11 of the wireless terminal 1 transmitting a TCP packet. L1 is the number of times for the wireless terminal 1 failing in transmission of a TCP packet (in other words, the number of times for the wireless terminal 1 failing to receive an ACK packet), and specifically the number of times for detecting RTO or duplicated ACK reception. The wireless terminal 1 may measure S and L1, whereby the TCP loss rate may be obtained. Note that this is a case where ARQ is on, and accordingly, retransmission according to ARQ may have been performed at the wireless layer, but behavior of the wireless layer does not have to be taken into consideration at the time of obtaining the TCP loss rate. If we say that P1=L1/S, present_TCP_Loss$_{ARQ\ ON}$ is represented as present_TCP_Loss$_{ARQ\ ON}$=P1.

On the other hand, description will be made regarding how to obtain estimated_TCP_Loss$_{ARQ\ OFF}$ which is the TCP loss rate to be estimated in the event that ARQ is set to off when ARQ is on. If ARQ is set to off, retransmission is not performed at the wireless layer. Therefore, a TCP packet wherein transmission/reception of a NACK signal has been performed even once when ARQ is on is consequently lost if ARQ is off. Accordingly, estimated_TCP_Loss$_{ARQ\ OFF}$ is represented as estimated_TCP_Loss$_{ARQ\ OFF}$=L1/S+(L2/S+L3/S) using the above-mentioned S. Here, L2 becomes "the number of times for the wireless terminal 1 receiving a NACK signal even once at the time of transmitting a TCP packet". L3 becomes "the number of times for the wireless terminal 1 transmitting a NACK signal even once at the time of receiving a TCP packet". The wireless terminal 1 may measure the above-mentioned L2 and L3, whereby estimated_TCP_Loss$_{ARQ\ OFF}$ may be obtained. If we say that P2=L2/S, and P3=L3/S, estimated_TCP_Loss$_{ARQ\ OFF}$ is represented as estimated_TCP_Loss$_{ARQ\ OFF}$=P1+(P2+P3).

Accordingly, the wireless terminal 1 may estimate estimated_TCP_Loss$_{ARQ\ OFF}$ which is an estimated TCP loss rate to be estimated in the event that ARQ is set to on when ARQ is off. Here, if we say that P2+P3=Prob$_{ARQ\ OFF}$, estimated_TCP_Loss$_{ARQ\ OFF}$ is represented as estimated_TCP_Loss$_{ARQ\ OFF}$=present_TCP_Loss$_{ARQ\ ON}$+Prob$_{ARQ\ OFF}$. Briefly speaking, Prob$_{ARQ\ OFF}$ corresponds to a probability that transmission/reception of a TCP packet will succeed using retransmission according to ARQ control. In other words, Prob$_{ARQ\ OFF}$ is a probability that transmission/reception of a TCP packet has succeeded by experiencing retransmission, and if ARQ is set to off, all for the worth of this probability become packets loss.

As described above, in the event that ARQ control is on, the wireless terminal 1 may obtain present_TCP_TP$_{ARQ\ ON}$ which is the current TCP throughput in the case that ARQ control is on, based on the above-mentioned present_TCP_RTT$_{ARQ\ ON}$ and present_TCP_Loss$_{ARQ\ ON}$. Also, the wireless terminal 1 may estimate estimated_TCP_TP$_{ARQ\ OFF}$ which is an estimated TCP throughput in the event that ARQ control is set to off, based on the above-mentioned estimated_TCP_RTT$_{ARQ\ OFF}$ and estimated_TCP_Loss$_{ARQ\ OFF}$.

Next, description will be made regarding a case where ARQ control of a service flow to perform TCP communication is off, based on FIGS. 4 and 5. At this time, the communication control unit 17 obtains $present\_TCP\_TP_{ARQ\ OFF}$ which is the current TCP throughput in the case that ARQ control is off, based on the TCP quality information. Also, the communication control unit 17 estimates $estimated\_TCP\_TP_{ARQ\ ON}$ which is an estimated TCP throughput in the case that ARQ control is on, based on the TCP quality information and wireless quality information.

Figure 4:
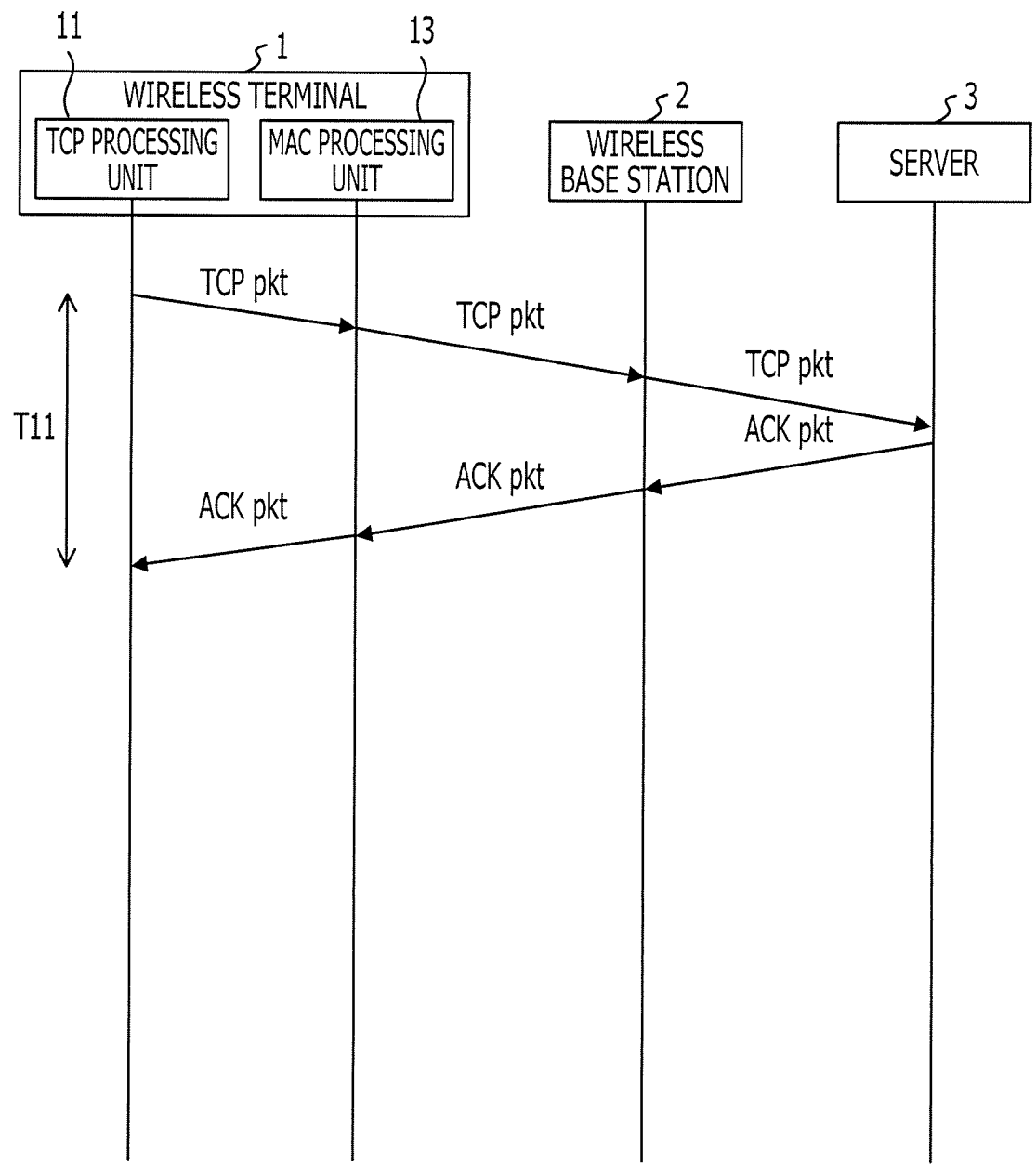
FIG. 4 illustrates behavior in transmission/reception of TCP packets without wireless ARQ control.

FIG. 4 is an example of communication based on TCP tickets to be performed between the wireless terminal 1 and server 3. This is a case where ARQ is off, and accordingly, when the wireless terminal 1 transmits a TCP packet to the server 3, retransmission according to ARQ is not performed. Also, when the server 3 transmits a reply TCP packet to the wireless terminal 1 as well, retransmission according to ARQ is not performed.

Now, in order to obtain TCP throughput, TCP RTT is required. $present\_TCP\_RTT_{ARQ\ OFF}$ which is the current TCP RTT in the case that ARQ is off is time T11 indicated in FIG. 4. Therefore, the transport measurement unit 15 obtains $present\_TCP\_RTT_{ARQ\ OFF}$ by measuring T11 to obtain TCP throughput in the case that ARQ is off.

Next, description will be made regarding how to obtain $estimated\_TCP\_RTT_{ARQ\ OFF}$ which is TCP RTT to be estimated in the event that ARQ is set to on when ARQ is off. As described above, with WiMAX, one control service flow is necessarily provided to the wireless terminal 1 and wireless base station 2, and also with the control service flow, ARQ is consistently set to on. $estimated\_TCP\_RTT_{ARQ\ OFF}$ is obtained by employing the control service flow.

Figure 5:
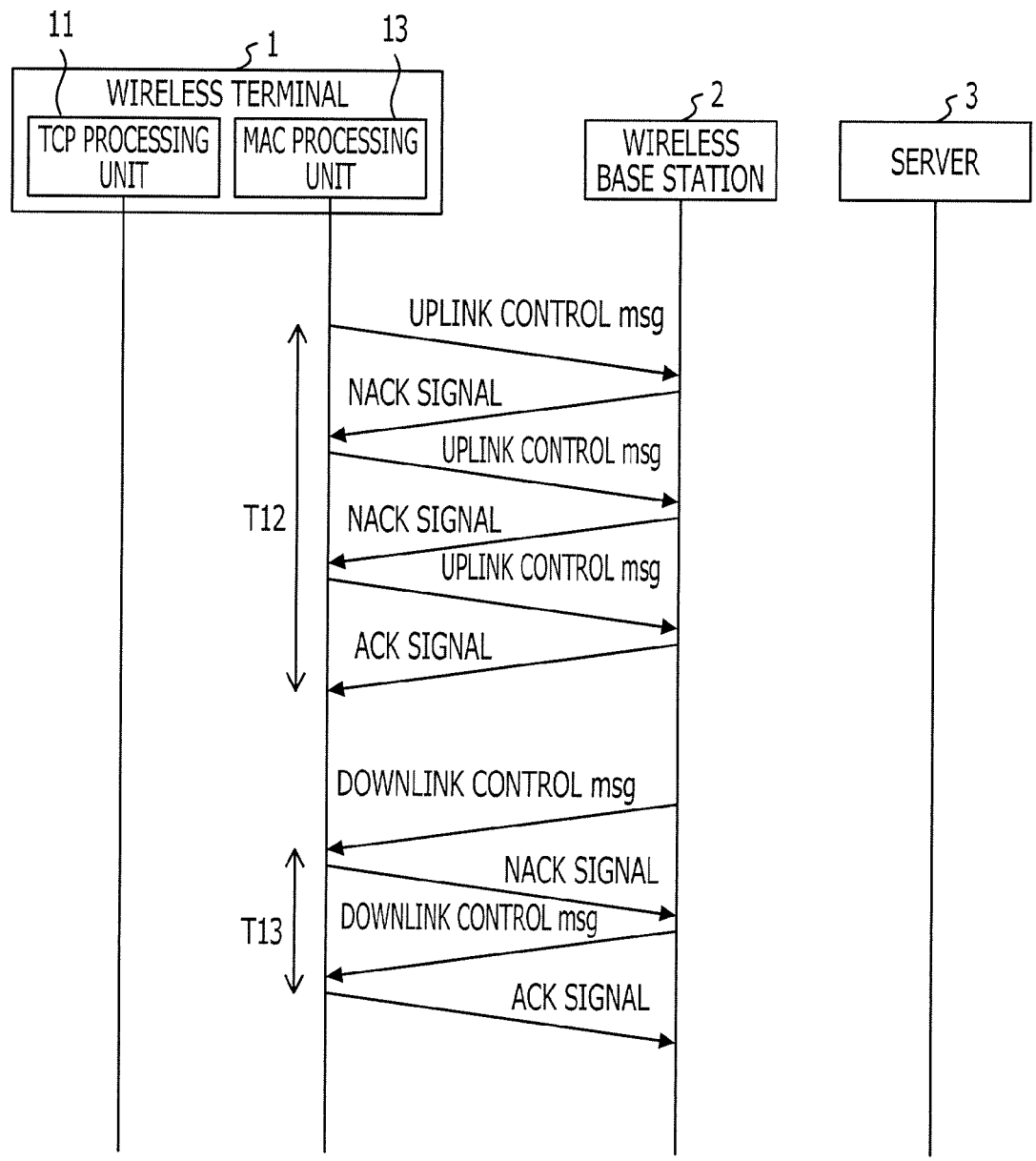
FIG. 5 illustrates behavior in transmission/reception of wireless control messages with wireless ARQ control.

FIG. 5 illustrates a scene of transmission/reception of a control message in a control service flow. As illustrated in the drawing, a control message is generated and also transmitted/received by the wireless layer, i.e., the MAC processing unit 13. In other words, the TCP layer, i.e., the TCP processing unit 11 has no concern with transmission/reception of a control message.

Here, the wireless terminal 1 may measure T12 and T13 in FIG. 5. Accordingly, the wireless terminal 1 may estimate $estimated\_TCP\_RTT_{ARQ\ OFF}=T11+(T12+T13)$ which is estimated TCP RTT to be estimated in the event that ARQ is set to on, using the measured T11, T12, and T13. Note that it goes without saying that the wireless terminal 1 may also directly measure T12 and T13, but may also indirectly measure T12 and T13 in the same way as T2 and T3 described above. Now, if we say that $T12+T13=Time_{ARQ\ ON}$, $estimated\_TCP\_RTT_{ARQ\ ON}$ is represented as $estimated\_TCP\_RTT\ ARQ\ ON = present\_TCP\_RTT_{ARQ\ OFF} + Time_{ARQ\ ON}$. Briefly speaking, $Time_{ARQ\ ON}$ corresponds to time not taken by stopping ARQ control. In other words, if we say that ARQ is set to on, transmission delay of a TCP packet is increased by the time of worth of $Time_{ARQ\ ON}$.

Next, in order to obtain TCP throughput, the TCP loss rate is required. $present\_TCP\_Loss_{ARQ\ OFF}$ which is the current TCP loss rate in the case that ARQ is off is represented as $present\_TCP\_Loss_{ARQ\ OFF}=L11/S$. Here, S is the number of times for the TCP processing unit 11 transmitting a TCP packet. L11 is the number of times for failing to transmit a TCP packet (in other words, the number of times for failing to receive an ACK packet), and specifically the number of times of RTO or occurrence of duplicated ACK reception. The wireless terminal 1 may measure S and L11, whereby the TCP loss rate may be obtained. If we say that $P11=L11/S$, $present\_TCP\_Loss_{ARQ\ OFF}$ is represented as $present\_TCP\_Loss_{ARQ\ OFF}=P11$.

Next, description will be made regarding how to obtain $estimated\_TCP\_Loss_{ARQ\ ON}$ which is an estimated TCP loss rate to be estimated in the event that ARQ is set to on when ARQ is off. If ARQ is set to on, retransmission is to be performed at the wireless layer. Therefore, of cases where packet loss (which is transmission failure of a TCP packet, and specifically RTO or duplicated ACK reception) occurs when ARQ is off, two cases may be conceived to be restored by setting ARQ to on. One is a case where the terminal has received a NACK signal after transmitting a certain wireless frame for the first time, but following which the terminal has received an ACK signal. That is to say, this is a case where a wireless frame of uplink is restored by ARQ control. The other is a case where the terminal has transmitted a NACK signal after receiving a certain wireless frame for the first time, but following which the terminal has transmitted an ACK signal. That is to say, this is a case where a wireless frame of downlink is restored by ARQ control.

Now, let us say that the number of times of a wireless frame of uplink being restored by ARQ control is L12, and the number of times of a wireless frame of downlink being restored by ARQ control is L13. Even in the event that ARQ control of a service flow to perform TCP communication is off, the wireless terminal 1 may measure L12 and L13 by observing a control service flow (ARQ is consistently on). Accordingly, the wireless terminal 1 may estimate $estimated\_TCP\_Loss_{ARQ\ OFF}=L11/S-(L12/S+L13/S)$ which is an estimated TCP loss rate to be estimated in the event that ARQ is set to on when ARQ is off. If we say that $P12=L12/S$ and $P13=L13/S$, $estimated\_TCP\_Loss_{ARQ\ OFF}$ is represented as $estimated\_TCP\_Loss_{ARQ\ OFF}=P11-(P12+P13)$.

As described above, in the event that ARQ control is off, the wireless terminal 1 may obtain $present\_TCP\_TP_{ARQ\ OFF}$ which is the current TCP throughput in the case that ARQ control is off, based on the above-mentioned $present\_TCP\_RTT_{ARQ\ OFF}$ and $present\_TCP\_Loss_{ARQ\ OFF}$. Also, the wireless terminal 1 may estimate $estimated\_TCP\_TP_{ARQ\ ON}$ which is an estimated TCP throughput in the event that ARQ control is set to off, based on the above-mentioned $estimated\_TCP\_RTT_{ARQ\ ON}$ and $estimated\_TCP\_Loss_{ARQ\ ON}$. Here, if we say that $P12+P13=Prob_{ARQ\ ON}$, $estimated\_TCP\_Loss_{ARQ\ ON}$ is represented as $estimated\_TCP\_Loss_{ARQ\ ON}=present\_TCP\_Loss_{ARQ\ OFF}+Prob_{ARQ\ ON}$. Briefly speaking, $Prob_{ARQ\ ON}$ corresponds to a probability that transmission/reception of a TCP packet will fail by ARQ control being stopped. In other words, if retransmission has been performed, $Prob_{ARQ\ ON}$ is a probability that transmission/reception of a TCP packet has succeeded, and packet loss is removed for the worth of this probability if ARQ is set to on.

Now, description will return to FIG. 2, and the transport measurement unit 15 will be described again. The transport measurement unit 15 monitors a TCP packet that the TCP processing unit 11 transmits/receives. The transport measurement unit 15 performs this monitoring for a monitoring period since the timer 18 was started until the time 18 is expired. In the event that ARQ of a service flow to perform TCP communication is on, the transport measurement unit 15 measures $present\_TCP\_RTT_{ARQ\ ON}$ which is the current TCP RTT and $present\_TCP\_Loss_{ARQ\ ON}$ which is the current TCP loss rate as the TCP quality information. On the other hand, In the event that ARQ of a service flow to perform TCP communication is off, the transport measurement unit 15 measures $present\_TCP\_RTT_{ARQ\ OFF}$ which is the current TCP RTT and $present\_TCP\_Loss_{ARQ\ OFF}$ which is the current TCP loss rate as the TCP quality information. Note that, with regard to the current TCP RTT, the transport measurement unit 15 obtains an average value during the monitoring period. With regard to the current TCP loss rate, the transport measurement unit 15 obtains a probability during the monitoring period.

Next, the link measurement unit 16 will be described again. The link measurement unit 16 monitors a wireless frame that the TCP processing unit 11 transmits/receives. The link measurement unit 16 performs this monitoring for the monitoring period since the timer 18 was started until the timer 18 is expired. In the event that ARQ of a service flow to perform TCP communication is on, the link measurement unit 16 measures the above-mentioned $Time_{ARQ\ OFF}$ and $Prob_{ARQ\ OFF}$ as the wireless quality information. On the other hand, in the event that ARQ of a service flow to perform TCP communication is off, the link measurement unit 16 measures the above-mentioned $Time_{ARQ\ ON}$ and $Prob_{ARQ\ ON}$ as the wireless quality information. Note that, with regard to $Time_{ARQ\ ON}$ and $Time_{ARQ\ OFF}$, the link measurement unit 16 obtains an average value during the monitoring period. With regard to $Prob_{ARQ\ ON}$ and $Prob_{ARQ\ OFF}$, the link measurement unit 16 obtains a probability during the monitoring period.

Both of $Time_{ARQ\ ON}$ and $Time_{ARQ\ OFF}$ correspond to RTT that varies based on ARQ control, and accordingly, these will be referred to as wireless delay time collectively. Both of $Prob_{ARQ\ ON}$ and $Prob_{ARQ\ OFF}$ correspond to a packet loss rate that varies based on ARQ control, and accordingly, these will be referred to as wireless loss rate collectively.

Description will sequentially be made regarding the first derivation unit 171, time estimation unit 172, probability estimation unit 173, second derivation unit 174, and determination unit 175 that the communication control unit 17 of the wireless terminal 1 includes.

The first derivation unit 171 obtains the current TCP throughput. First, the first derivation unit 171 obtains $present\_TCP\_RTT_{ARQ\ ON}$ or $present\_TCP\_RTT_{ARQ\ OFF}$ which is the current TCP RTT which is the current TCP RTT that the transport measurement unit 15 obtained. Also, the first derivation unit 171 obtains $present\_TCP\_Loss_{ARQ\ ON}$ or $present\_TCP\_Loss_{ARQ\ OFF}$ which is the current TCP loss rate that the transport measurement unit 15 obtained. The first derivation unit 171 obtains the current TCP throughput based on Expression (1) employing the obtained current TCP RTT and TCP loss rate, and B and TCP-specific parameter. Here, the data size B or TCP-specific parameter α may be obtained from the transport measurement unit 15 or TCP processing unit 11, or given values may be employed.

The time estimation unit 172 obtains estimated TCP RTT. The time estimation unit 172 obtains $present\_TCP\_RTT_{ARQ\ ON}$ or $present\_TCP\_RTT_{ARQ\ OFF}$ which is the current TCP RTT obtained by the transport measurement unit 15. Also, the time estimation unit 172 obtains $Time_{ARQ\ ON}$ or $Time_{ARQ\ OFF}$ which is the wireless delay time obtained by the link measurement unit 16. The time estimation unit 172 obtains, in the event that ARQ is on, $estimated\_TCP\_RTT_{ARQ\ OFF} = present\_TCP\_RTT_{ARQ\ ON} - Time_{ARQ\ OFF}$ which is estimated TCP RTT. Also, in the event that ARQ is off, the time estimation unit 172 obtains $estimated\_TCP\_RTT_{ARQ\ ON} = present\_TCP\_RTT_{ARQ\ OFF} + Time_{ARQ\ ON}$ which is estimated TCP RTT.

The probability estimation unit 173 obtains an estimated TCP loss rate. First, the probability estimation unit 173 obtains $present\_TCP\_Loss_{ARQ\ ON}$ or $present\_TCP\_Loss_{ARQ\ OFF}$ which is the current TCP loss rate obtained by the transport measurement unit 15. Also, the probability estimation unit 173 obtains $Prob_{ARG\ ON}$ or $PrOb_{ARQ\ OFF}$ which is the wireless loss rate obtained by the link measurement unit 16. The probability estimation unit 173 obtains, in the event that ARQ is on, $estimated\_TCP\_Loss_{ARQ\ OFF} = present\_TCP\_Loss_{ARQ\ ON} + PrOb_{ARQ\ OFF}$, which is an estimated TCP loss rate. Also, in the event that ARQ is off, the probability estimation unit 173 obtains $estimated\_TCP\_Loss_{ARQ\ ON} = present\_TCP\_Loss_{ARQ\ OFF} - PrOb_{ARQ\ ON}$, which is an estimated TCP loss rate.

The second derivation unit 174 obtains an estimated TCP throughput. First, the second derivation unit 174 obtains $estimated\_TCP\_RTT_{ARQ\ ON}$ or $estimated\_TCP\_RTT_{ARQ\ OFF}$ which is estimated TCP RU obtained by the time estimation unit 172. Also, the second derivation unit 174 obtains $estimated\_TCP\_Loss_{ARQ\ ON}$ or $estimated\_TCP\_Loss_{ARQ\ OFF}$ which is an estimated TCP loss rate obtained by the probability estimation unit 173. The second derivation unit 174 obtains an estimated TCP throughput based on Expression (1) employing the obtained estimated TCP RTT and TCP loss rate, and B and TCP-specific parameter. Here, the data size B or TCP-specific parameter α may be obtained from the TCP processing unit 11, or given values may be employed.

The determination unit 175 determines necessity of ARQ control from the current TCP throughput and estimated TCP throughput. First, the determination unit 175 obtains the current TCP throughput from the first derivation unit 171. Also, the determination unit 175 obtains the estimated TCP throughput from the second derivation unit 174. The determination unit 175 then compares the current TCP throughput and estimated TCP throughput. If the current TCP throughput is greater, the determination unit 175 ends the processing. On the other hand, if the estimated TCP throughput is greater, the determination unit 175 inputs a signal to switch on/off of ARQ of a service flow to perform TCP communication to the MAC processing unit 13. That is to say, in the event that the estimated TCP throughput is greater and also ARQ is on, the determination unit 175 inputs a signal to set ARQ control to off to the MAC processing unit 13. Also, in the event that the estimated TCP throughput is greater and also ARQ is off, the determination unit 175 inputs a signal to set ARQ control to on to the MAC processing unit 13.

Figure 6:
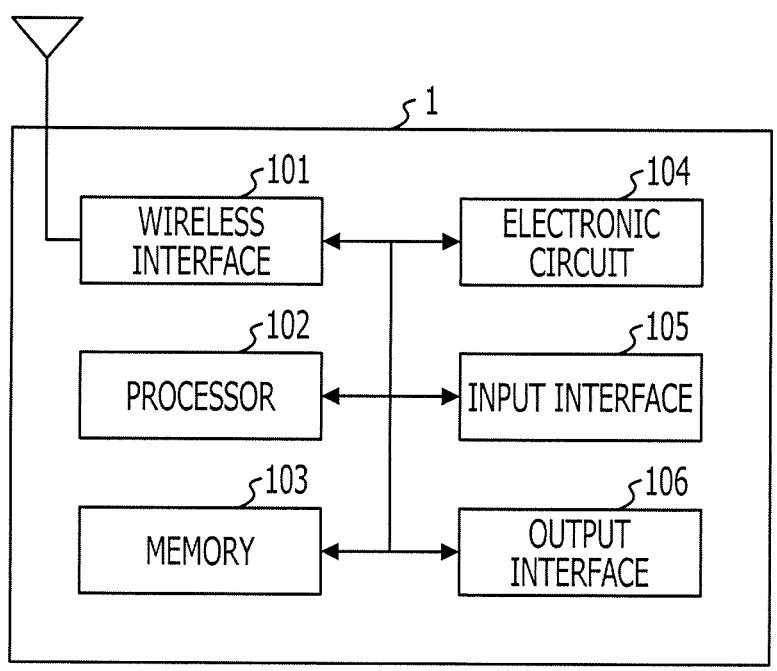
FIG. 6 illustrates a hardware configuration of the wireless terminal in the communication system according to the first embodiment.

An example of the hardware configuration of the wireless terminal 1 according to the first embodiment will be described with reference to FIG. 6. The above-mentioned functions of the wireless terminal 1 are realized by a part or all of the following hardware parts. The wireless terminal 1 according to the above embodiment includes a wireless IF (InterFace) 101, a processor 102, memory 103, an electronic circuit 104, an input IF 105, an output IF 106, and so forth. The wireless IF 101 is an interface device to perform wireless communication with the wireless base station 2, and is an antenna, for example. The processor 102 is a device to process data, and includes a CPU (Central Processing Unit), a DSP (Digital Signal Processor) and so forth, for example. The memory 103 is a device to store data, and includes ROM (Read Only Memory), RAM (Random Access Memory), and so forth, for example. The electronic circuit 104 includes an LSI (Large Scale Integration) chip, an FPGA (Field-Programming Gate Array), an ASIC (Application Specific Integrated Circuit) and so forth, for example. The input IF 105 is a device to perform input, and includes an operating button, a microphone, and so forth, for example. The output IF 106 is a device to perform output, and includes a display, a speaker, and so forth, for example.

Correspondence relationship between the function configuration and hardware configuration of the wireless terminal 1 will be described. The TCP processing unit 11, IP processing unit 12, MAC processing unit 13, transport measurement unit 15, link measurement unit 16, communication control unit 17, first derivation unit 171, time estimation unit 172, probability estimation unit 173, second derivation unit 174, determination unit 175, and timer 18 of the wireless terminal 1 are realized by the processor 102, memory 103, and electronic circuit 104, for example. The wireless communication unit 14 of the wireless terminal 1 is realized by the wireless IF 101 and electronic circuit 104, for example.

Description will be made specifically below. The processor 102 obtains the current TCP RTT and current TCP loss rate, and stores these in the memory 103, thereby realizing the transport measurement unit 15. The processor 102 obtains the wireless delay time and wireless loss rate, and stores these in the memory 103, thereby realizing the link measurement unit 16. The processor 102 reads out the current TCP RTT and current TCP loss rate from the memory 103, obtains the current TCP throughput, and stores this in the memory 103, thereby realizing the first derivation unit 171. The processor 102 reads out the current TCP RTT and wireless delay time from the memory 103, obtains estimated TCP RTT, and stores this in the memory 103, thereby realizing the time estimation unit 172. The processor 102 reads out the current TCP loss rate and wireless loss rate from the memory 103, obtains an estimated TCP loss rate, and stores this in the memory 103, thereby realizing the probability estimation unit 173. The processor 102 reads out the estimated TCP RTT and estimated TCP loss rate from the memory 103, obtains estimated TCP throughput, and stores this in the memory 103, thereby realizing the second derivation unit 174. The processor 102 reads out the current TCP throughput and estimated TCP throughput from the memory 103 and determines whether to carry out or stop retransmission control, thereby realizing the determination unit 175.

Figure 7:
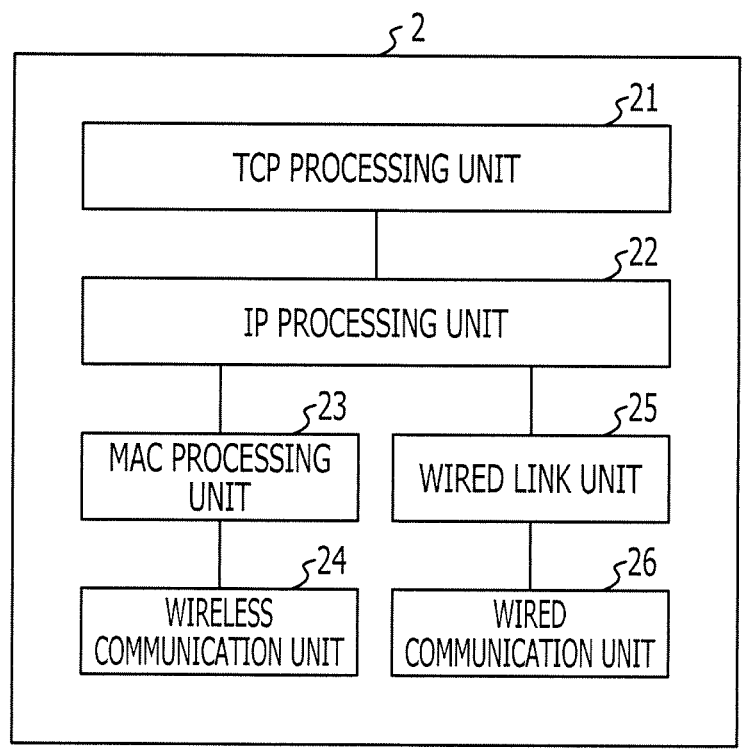
FIG. 7 illustrates a function configuration of a wireless base station in the communication system according to the first embodiment.

FIG. 7 illustrates the function configuration of the wireless base station 2 according to the first embodiment.

The wireless base station 2 includes a TCP processing unit 21, an IP processing unit 22, a MAC processing unit 23, a wireless communication unit 24, a wired link unit 25, and a wired communication unit 26. The TCP processing unit 21, IP processing unit 22, MAC processing unit 23, and wireless communication unit 24 of the wireless base station 2 are overlapped with the corresponding functions of the wireless terminal 1, and accordingly, description will be omitted.

The wired link unit 25 generates a frame used in wired network based on an IP packet input from the IP processing unit 22 to output to the wired communication unit 26. The wired communication unit 26 transmits the wire frame to the server 3 via a cabled line. Also, the wired communication unit 26 outputs the wire frame received from the server 3 via the cabled line to the wired link unit 25. The wired link unit 25 extracts an IP packet from the wire frame input from the wired communication unit 26 to output to the IP processing unit 22.

Figure 8:
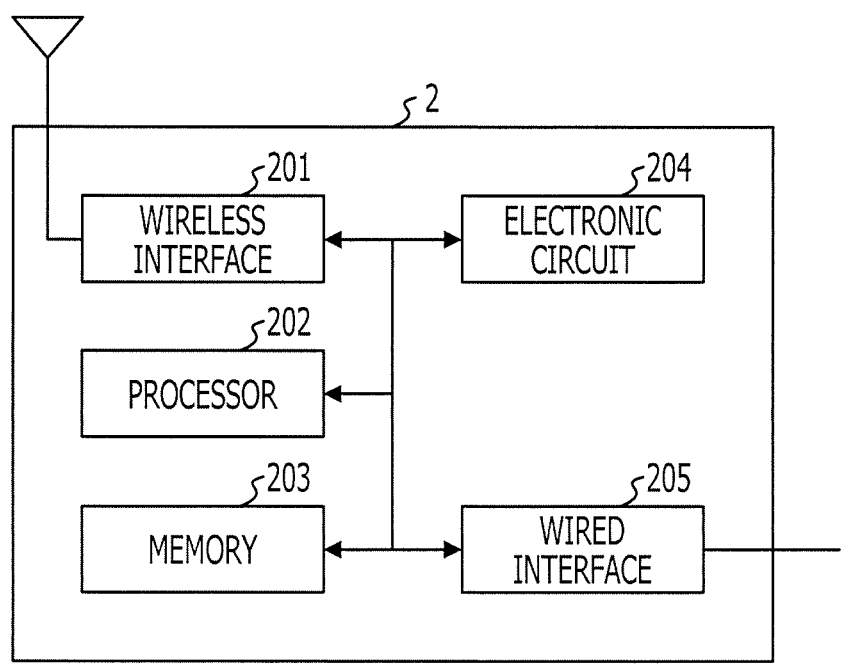
FIG. 8 illustrates a hardware configuration of the wireless base station in the communication system according to the first embodiment.

An example of the hardware configuration of the base station 2 according to the first embodiment will be described with reference to FIG. 8. The above-mentioned functions of the wireless base station 2 are realized by a part or all of the following hardware parts. The wireless base station 2 according to the above embodiment includes a wireless IF (Inter-Face) 201, a processor 202, memory 203, an electronic circuit 204, a wired IF 205, and so forth. The wireless IF 201 is an interface device to perform wireless communication with the wireless terminal 1, and is an antenna, for example. The processor 202 is a device to process data, and includes a CPU (Central Processing Unit), a DSP (Digital Signal Processor) and so forth, for example. The memory 203 is a device to store data, and includes ROM (Read Only Memory), RAM (Random Access Memory), and so forth, for example. The electronic circuit 204 includes an LSI (Large Scale Integration) chip, an FPGA (Field-Programming Gate Array), an ASIC (Application Specific Integrated Circuit) and so forth, for example. The wired IF 205 is an interface device to perform wired communication with another device including the server 3 using the cabled line connected to a network on the network side of a cellular phone system (so-called back-holes network).

Correspondence relationship between the function configuration and hardware configuration of the base station 2 will be described. The TCP processing unit 21, IP processing unit 22, MAC processing unit 23, and wired link unit 25 of the wireless base station 2 are realized by the processor 202, memory 203, and electronic circuit 204, for example. The wireless communication unit 24 of the wireless base station 2 is realized by the wireless IF 201 and electronic circuit 204, for example. The wired communication unit 26 of the wireless base station 2 is realized by the wired IF 205 and electronic circuit 204, for example.

Figure 9:
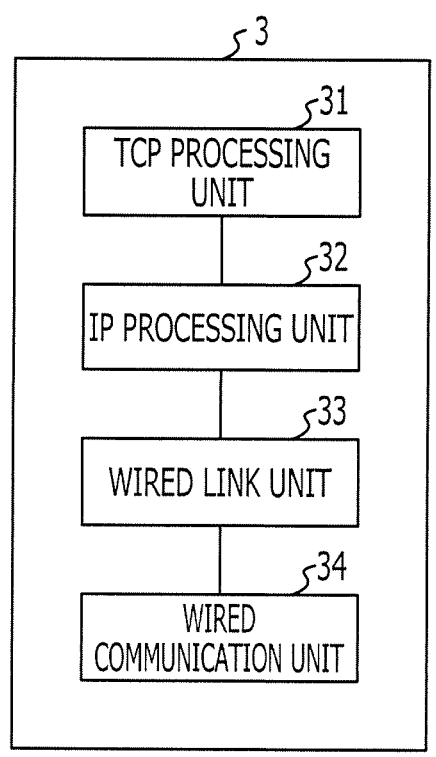
FIG. 9 illustrates a function configuration of a server in the communication system according to the first embodiment.

FIG. 9 illustrates the function configuration of the server 3 according to the first embodiment. The server 3 includes a TCP processing unit 31, an IP processing unit 32, a wired link unit 33, and a wired communication unit 34. The TCP processing unit 31, IP processing unit 32, wired link unit 33, and wired communication unit 34 of the server 3 are overlapped with the corresponding functions of the wireless terminal 1 or wireless base station 2, and accordingly, description will be omitted.

Figure 10:
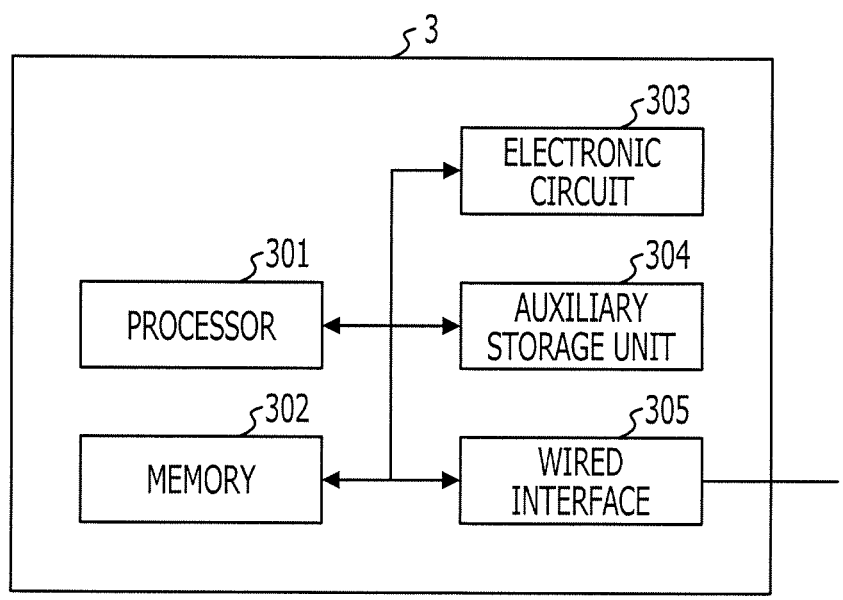
FIG. 10 illustrates a hardware configuration of the server in the communication system according to the first embodiment.

An example of the hardware configuration of the server 3 according to the first embodiment will be described with reference to FIG. 10. The above-mentioned functions of the server 3 are realized by a part or all of the following hardware parts. The server 3 according to the above embodiment includes a processor 301, memory 302, auxiliary storage 304, an electronic circuit 303, a wired IF 305, and so forth. The processor 301 is a device to process data, and includes a CPU (Central Processing Unit), a DSP (Digital Signal Processor) and so forth, for example. The memory 302 is a device to store data, and includes ROM (Read Only Memory), RAM (Random Access Memory), and so forth, for example. The auxiliary storage 304 is a device to secondarily store data, and includes an HDD (Hard Disk Drive), various external storage media, and readers thereof. The electronic circuit 303 includes an LSI (Large Scale Integration) chip, an FPGA (Field-Programming Gate Array), an ASIC (Application Specific Integrated Circuit) and so forth, for example. The wired IF 305 is an interface device to perform wired communication with another device including the wireless base station 2 or the like using the cabled line.

Correspondence relationship between the function configuration and hardware configuration of the server 3 will be described. The TCP processing unit 31, IP processing unit 32, and wired link unit 35 of the server 3 are realized by the processor 301, memory 302, and electronic circuit 303, for example. A wire transmission unit of the server 3 is realized by the wireless IF 305 and electronic circuit 303, for example.

Figure 11:
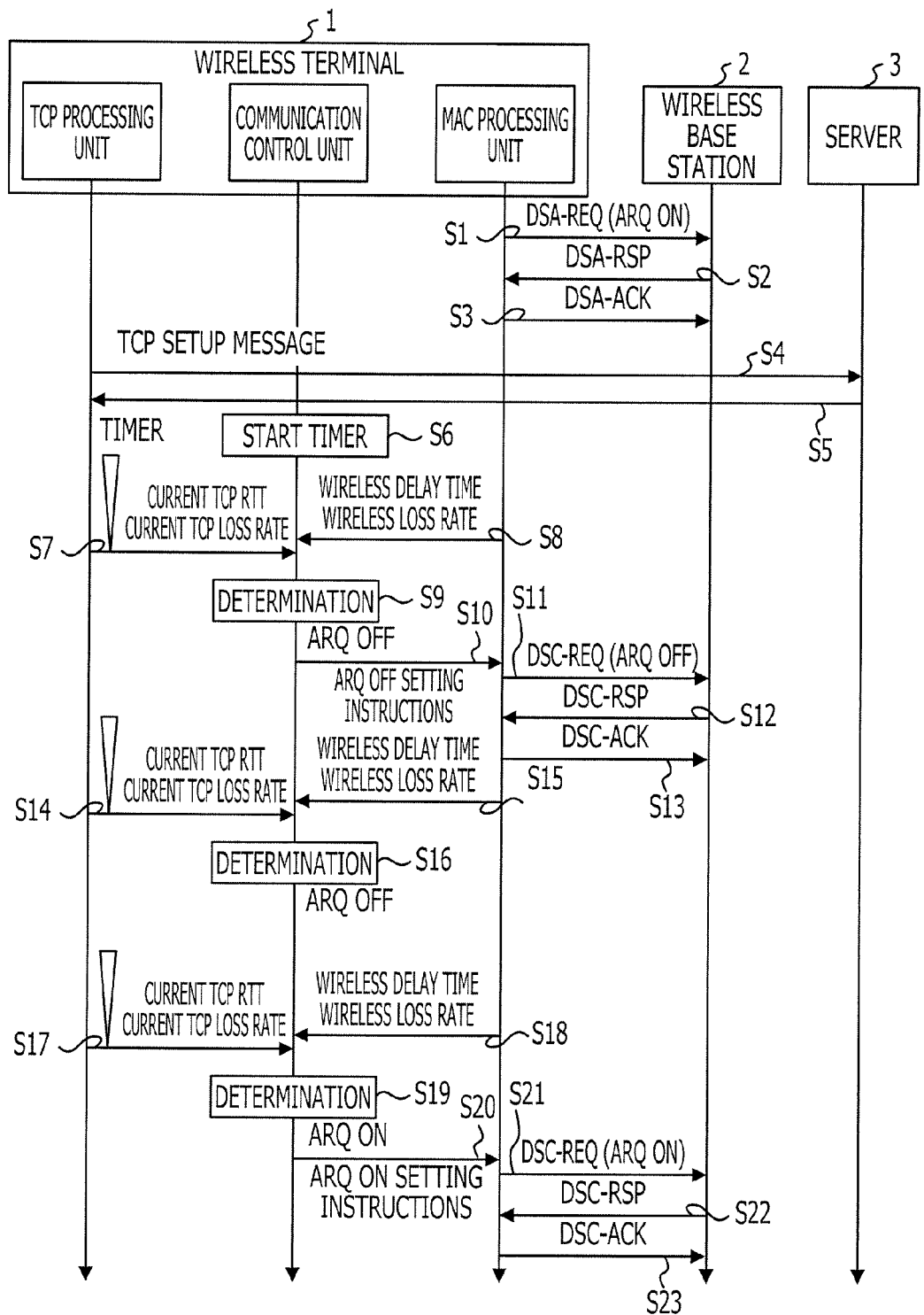
FIG. 11 illustrates an operation sequence in the communication system according to the first embodiment.

FIG. 11 illustrates an example of an operation sequence of the wireless system according to the first embodiment. The first embodiment is an embodiment to which WiMAX has been applied as an example, and accordingly, WiMAX-specific terms and concepts will appear. However, the first embodiment is just an example, and it has to be noted that the present technology may be applied to wireless communication methods other than WiMAX.

The wireless terminal 1 performs, when connecting to the wireless base station 2 for the first time (e.g., when turning on the power), given exchange called a network entry procedure with the wireless base station 2. Here, let us say that the network entry procedure has already been completed.

First, the MAC processing unit 13 of the wireless terminal 1 transmits a control message DSA-REQ for requesting a service flow to perform communication with the wireless base station 2 (S1). Multiple service flows may be provided between the wireless terminal 1 and wireless base station 2, and whether or not ARQ is carried out (on or off) may be set to each service flow. Now, for example, let us say that the MAC processing unit 13 of the wireless terminal 1 requests, at the time of setup of a service flow, setting ARQ to on from the service flow thereof. It goes without saying that the MAC processing unit 13 of the wireless terminal 1 may request, at the time of setup of a service flow, setting ARQ to off from the service flow thereof.

In response to this, the MAC processing unit 23 of the wireless base station 2 registers the service flow requested from the wireless terminal 1 (hereafter, referred to as $f_1$), and sends a control message DSA-RSP for setup reply back to the wireless terminal 1 (S2). Also, upon receiving DSA-RSP, the MAC processing unit 13 of the wireless terminal 1 sends a control message DSA-ACK for reception confirmation reply back to the wireless base station 2 (S3).

Also, though not clearly indicated in the drawing, one control service flow (hereafter, referred to as $f_0$) is set up in accordance with the same procedure as with the above S1 through S3. The control service flow is a particular service flow to transmit/receive various control messages at the wireless layer. Here, with the control service flow, ARQ is consistently set to on.

Also, with this example, though the service flow (except for the control service flow) is just one of $f_1$, multiple service flows may be set up as appropriate.

Next, a client application on the wireless terminal 1 performs setup of TCP with a server application on the server 3. Examples of the client application include an electronic mailer, a MUA (Mail User Agent), and a web browser. Also, examples of the server application include a mail server, a MTA (Message Transfer Agent), and a web server. First, the TCP processing unit 11 of the wireless terminal 1 transmits a TCP setup message (SYN packet) to the server 3 via the service flow $f_1$ (S4). Upon receiving the SYN packet, the TCP processing unit 31 of the server 3 transmits a SYN/ACK packet which is a confirmation reply signal to the wireless terminal 1 (S5). Upon receiving the SYN/ACK packet, the TCP processing unit 11 of the wireless terminal 1 transmits an ACK packet to the wireless base station 2 (not illustrated). Thus, a TCP connection is established between the wireless terminal 1 and server 3. Upon the TCP connection being established, the TCP processing unit 11 of the wireless terminal 1 starts the timer 18 (S6).

Hereafter, communication using TCP packets is performed between the wireless terminal 1 and server 3 via the wireless base station 2, via the service flow $f_1$. As described above, the TCP processing unit 11, IP processing unit 12, MAC processing unit 13, and wireless communication unit 14 of the wireless terminal 1 are collaborated with the TCP processing unit 21, IP processing unit 22, MAC processing unit 23, and wireless communication unit 24, thereby transmitting/receiving a wireless frame including a TCP packet between the wireless terminal 1 and wireless base station 2. Also, the TCP processing unit 21, IP processing unit 22, and wired communication unit 26 of the wireless base station 2 are collaborated with the corresponding units of the server 3, thereby transmitting/receiving a TCP packet between the base station 2 and server 3.

Now, upon the timer 18 being started, the transport measurement unit 15 of the wireless terminal 1 starts monitoring of a TCP packet. Also, upon the timer 18 being started, the link measurement unit 16 of the wireless terminal 1 starts monitoring of a wireless frame. Each monitoring may be performed for each service flow, or may be performed by collecting some service flows. Monitoring of a TCP packet and a wireless frame is consistently performed while the timer 18 operates, i.e., during a monitoring period. Each time the transport measurement unit 15 of the wireless terminal 1 performs transmission/reception of a TCP packet, the transport measurement unit 15 obtains the above-mentioned current TCP RTT and current TCP loss rate. Also, each time the link measurement unit 16 transmits/receives a wireless frame, the link measurement unit 16 obtains the above-mentioned wireless delay time and wireless loss rate. Note that, with regard to the current TCP RTT and wireless delay time, an average value during the monitoring period is obtained. Also, with regard to the current TCP loss rate and wireless loss rate, a probability during the monitoring period is obtained.

Upon the timer 18 expiring, the communication control unit 17 of the wireless terminal 1 obtains the TCP RTT (average value) and TCP loss rate at the service flow $f_1$ from the transport measurement unit 15 (S7). Further, the communication control unit 17 of the wireless terminal 1 obtains the wireless delay time (average value) and wireless loss rate at the service flow $f_1$ from the link measurement unit 16 (S8).

Next, the communication control unit 17 of the wireless terminal 1 performs determination of necessity to carry out ARQ based on the obtained information (S9). Now, let us say that the communication control unit 17 has determined that ARQ does not have to be carried out at the service flow $f_1$, i.e., higher throughput is obtained by stopping ARQ. In this case, the communication unit 17 outputs a signal to request setting ARQ to off of the service flow $f_1$ from the wireless base station 2, to the MAC processing unit 13 (S10). After determination, the communication control unit 17 starts the timer 18 again regardless of the determination result.

The MAC processing unit 13 of the wireless terminal 1 transmits, based on the signal received in S10, a DSC-REQ which is a service flow setup message (at the time of updating) to the wireless base station 2 (S11). At this time, the MAC processing unit 13 of the wireless terminal 1 requests setting ARQ to off of the service flow $f_1$ from the wireless base station 2 in this DSC-REQ.

In response to this, the MAC processing unit 23 of the wireless base station 2 stops ARQ as to the service flow $f_1$ requested from the wireless terminal 1, and sends a control message DSC-RSP for setup reply (at the time of updating) back to the wireless terminal 1 (S12). Also, upon receiving a DSA-RSP, the MAC processing unit 13 of the wireless terminal 1 sends a control message DSC-ACK for reception confirmation reply (at the time of updating) back to the wireless base station 2 (S13).

Upon the timer 18 expiring again, the communication control unit 17 of the wireless terminal 1 performs obtaining of the same information as with S7 and S8 (S14 and S15), and also perform the same determination as with S9 (S16). However, in S14 the communication control unit 17 obtains the wireless delay time and wireless loss rate from the link measurement unit 16 based on the service flow $f_0$ (instead of the service flow $f_1$). This is because, with the service flow $f_1$, ARQ is stopped, and accordingly, the communication unit 17 fails to obtain the wireless delay time and wireless loss rate of the service flow $f_1$. Here as well, let us say that the communication control unit 17 has determined that ARQ does not have to be carried out at the service flow $f_1$, i.e., higher throughput is obtained by continuously stopping ARQ. In this case, the communication unit 17 does not output a signal to the MAC processing unit 13. This is because request to switch ARQ does not have to be performed as to the wireless base station 2. After determination, the communication control unit 17 starts the timer 18 again regardless of the determination result.

Upon the timer 18 further expiring, the communication control unit 17 of the wireless terminal 1 performs obtaining of the same information as with S14 and S15 (S17 and S18), and also perform the same determination as with S16 (S19). Now, let us say that the communication control unit 17 has determined that ARQ has to be carried out at the service flow $f_1$, i.e., higher throughput is obtained by carrying out ARQ. In this case, the communication unit 17 outputs a signal to request setting ARQ to on of the service flow $f_1$ from the wireless base station 2, to the MAC processing unit 13 (S20). After determination, the communication control unit 17 starts the timer 18 again regardless of the determination result.

The MAC processing unit 13 of the wireless terminal 1 transmits, based on instructions received in S17, a DSC-REQ which is a service flow setup message (at the time of updating) to the wireless base station 2 (S21). At this time, the MAC processing unit 13 of the wireless terminal 1 requests, with this DS-REQ, setting ARQ to on of the service flow $f_1$ from the wireless base station 2.

In response to this, the MAC processing unit 23 of the wireless base station 2 starts ARQ as to the service flow $f_1$ requested from the wireless terminal 1, and sends a control message DSC-RSP for setup reply (at the time of updating) back to the wireless terminal 1 (S22). Also, upon receiving a DSA-RSP, the MAC processing unit 13 of the wireless terminal 1 sends a control message DSC-ACK for reception confirmation reply (at the time of updating) back to the wireless base station 2 (S23).

Figure 12:
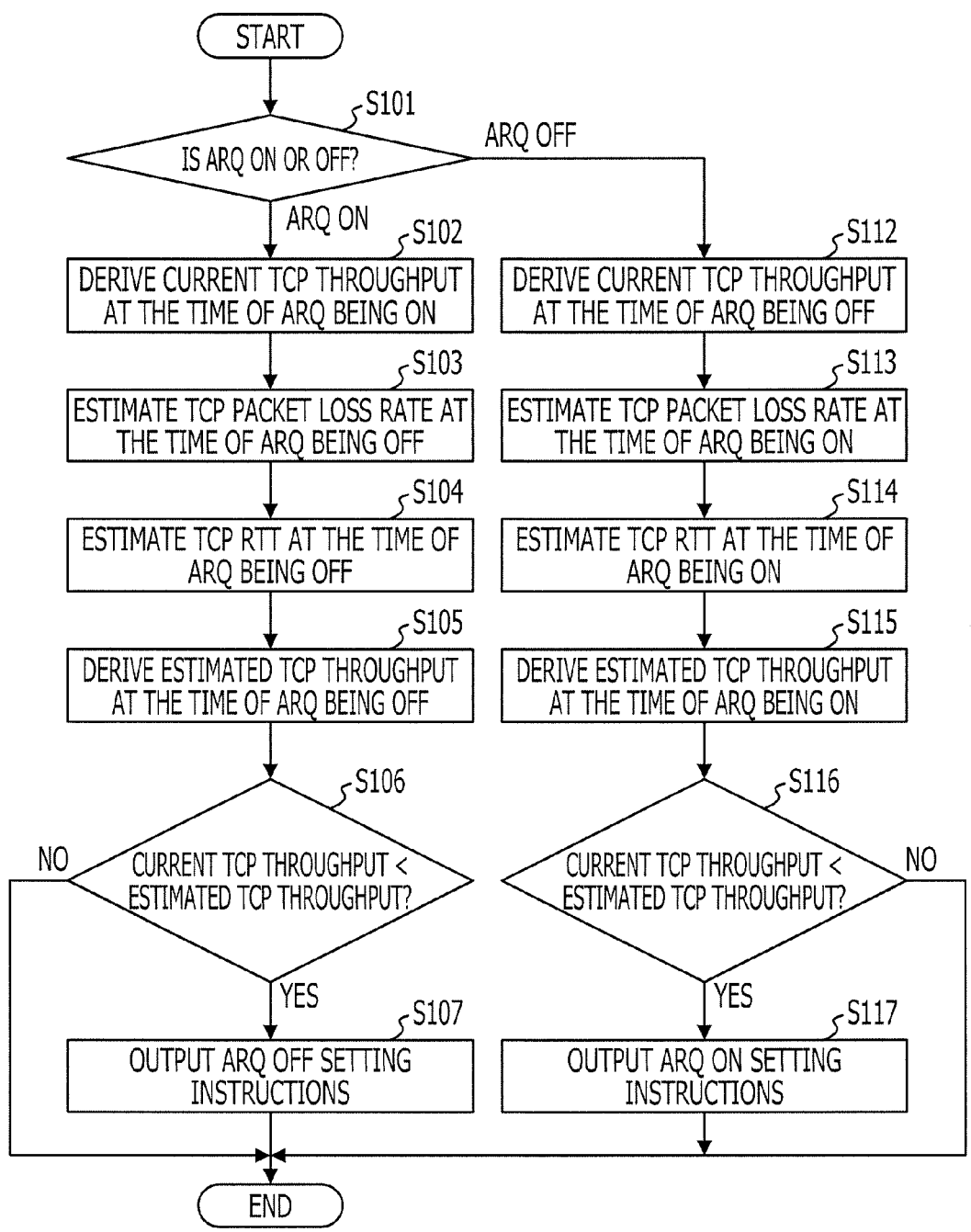
FIG. 12 illustrates a processing flow according to a determination unit of the wireless terminal in the communication system according to the first embodiment.

FIG. 12 is a flowchart of processing that the communication control unit 17 of the wireless terminal 1 performs in association with the processing in S16 and S19.

First, the communication control unit 17 determines the ARQ state of a service flow. Specifically, the communication control unit 17 determines whether ARQ of a service flow is on or off (S101).

Description will be made regarding a case where determination is made in S101 that ARQ is on. The first derivation unit 171 of the communication control unit 17 obtains present_TCP_TP$_{ARQ\ ON}$ which is the current TCP throughput when ARQ is on (S102). The probability estimation unit 173 of the communication control unit 17 obtains estimated_TCP_Loss$_{ARQ\ OFF}$ which is an estimated TCP loss rate in the event that ARQ is set to off (S103). The time estimation unit 172 of the communication control unit 17 obtains estimated_TCP_RTT$_{ARQ\ OFF}$ which is estimated TCP RTT in the event that ARQ is set to off (S104). The second derivation unit 174 of the communication control unit 17 obtains estimated_TCP_TP$_{ARQ\ OFF}$ which is estimated TCP throughput in the event that ARQ is set to off (S105). The determination unit 175 of the communication control unit 17 determines whether or not estimated_TCP_TP$_{ARQ\ OFF}$>present_TCP_TP$_{ARQ\ ON}$ (S106). In the event that determination in S106 is YES (determination is made that ARQ does not have to be carried out), the determination unit 175 of the communication control unit 17 outputs a signal to set ARQ to off to the MAC processing unit 13 (S107). In the event that determination in S106 is NO (determination is made that ARQ has to be carried out), the processing is ended (as a result thereof, ARQ is continuously on).

Description will be made regarding a case where determination is made in S101 that ARQ is off. The first derivation unit 171 of the communication control unit 17 obtains present_TCP_TP$_{ARQ\ OFF}$ which is the current TCP throughput when ARQ is off (S112). The probability estimation unit 173 of the communication control unit 17 obtains estimated_TCP_Loss$_{ARQ\ ON}$ which is an estimated TCP loss rate in the event that ARQ is set to on (S113). The time estimation unit 172 of the communication control unit 17 obtains estimated_TCP_RTT$_{ARQ\ ON}$ which is estimated TCP RTT in the event that ARQ is set to on (S114). The second derivation unit 174 of the communication control unit 17 obtains estimated_TCP_TP$_{ARQ\ ON}$ which is estimated TCP throughput in the event that ARQ is set to on (S115). The determination unit 175 of the communication control unit 17 determines whether or not estimated_TCP_TP$_{ARQ\ ON}$>present_TCP_TP$_{ARQ\ OFF}$ (S116). In the event that determination in S106 is YES (determination is made that ARQ has to be carried out), the determination unit 175 of the communication control unit 17 outputs a signal to set ARQ to on to the MAC processing unit 13 (S117). In the event that determination in S106 is NO (determination is made that ARQ does not have to be carried out), the processing is ended (as a result thereof, ARQ is continuously off).

Description will be made regarding an example of a control message that the MAC processing unit 13 of the wireless terminal 1 and the MAC processing unit 23 of the wireless base station 2 transmit/receive, based on FIGS. 13A through 14C.

FIG. 13A indicates the DSA-REQ message. The DSA-REQ message is, at the time of newly creating a service flow, a message to perform setup request of a service flow. With an ARQ Enable TLV field, on/off of ARQ is set to a service flow to be newly created.

FIG. 13B indicates the DSA-RSP message. The DSA-RSP message is a reply message as to the DSA-REQ message. With an SFID TLV field, the identifier of a newly created service flow is set.

FIG. 13C indicates the DSA-ACK message. The DSA-ACK message is a reply message as to the DSA-RSP message.

FIG. 14A indicates the DSC-REQ message. The DSC-REQ message is a message to perform setup request of the service flow at the time of updating the setting of an existing service flow. With a CID TLV field, the identifier of the existing service flow is set. With an ARQ Enable TLV field, on/off of ART as to the existing service flow is set.

FIG. 14B is the DSC-RSP message. The DSC-RSP message is a reply message as to the DSC-REQ message.

FIG. 14C is the DSC-ACK message. The DSC-ACK message is a reply message as to the DSC-RSP message.

As described above, according to the communication system according to the first embodiment, TCP throughput while stopping ARQ is obtained without actually stopping ARQ with wireless communication. Therefore, there may be avoided a case where TCP throughput is further deteriorated by switching ARQ from on to off. Also, according to the communication system according to the first embodiment, TCP throughput while carrying out ARQ is obtained without actually carrying out ARQ with wireless communication. Therefore, there may be avoided a case where TCP throughput is further deteriorated by switching ARQ from off to on. That is to say, according to the communication system according to the first embodiment, transition to stopping of retransmission control may be carried out before stopping after confirming throughput after stopping.

[b] Second Embodiment

The first embodiment is to estimate throughput in the event of stopping ARQ at the time of carrying out ARQ at the wireless layer, and to estimate throughput in the event of starting ARQ at the time of stopping ARQ at the wireless layer. On the other hand, a second embodiment is to estimate throughput in the event of changing the maximum number of times of retransmission of ARQ at the time of carrying out ARQ based on a given number of times of transmission.

The second embodiment has many points common to the first embodiment. Hereafter, description will be made in the second embodiment with a point different from the first embodiment as the center.

Though the function configuration of a wireless terminal 1 according to the second embodiment is the same as with the first embodiment, the processes of the link measurement unit 16, time estimation unit 172, probability estimation unit 173, second derivation unit 174, and determination unit 175 differ from those in the first embodiment. Hereafter, description will sequentially be made regarding these.

The link measurement unit 16 of the wireless terminal 1 monitors a wireless frame that the TCP processing unit 11 transmits/receives. The link measurement unit 16 obtains the wireless delay time and wireless loss rate during the monitoring period. With the second embodiment, the contents of the wireless delay time and wireless loss rate differ from those in the first embodiment. Hereafter, description will be made assuming that ARQ is on, and the maximum number of times of retransmission of ARQ is N.

The wireless delay time according to the second embodiment will be described. The link measurement unit 16 obtains $Time_{ARQ\ N-1}$, $Time_{ARQ\ N-2}$, ..., $Time_{ARQ\ 1}$, $Time_{ARQ\ 0}$ (=$Time_{ARQ\ OFF}$) as wireless delay time. Here, $Time_{ARQ\ i}$ ($0 \le i \le N-1$) correspond to delay time that are reduced in the event that the maximum number of times of retransmission according to ARQ control is reduced to i times.

Figure 15:
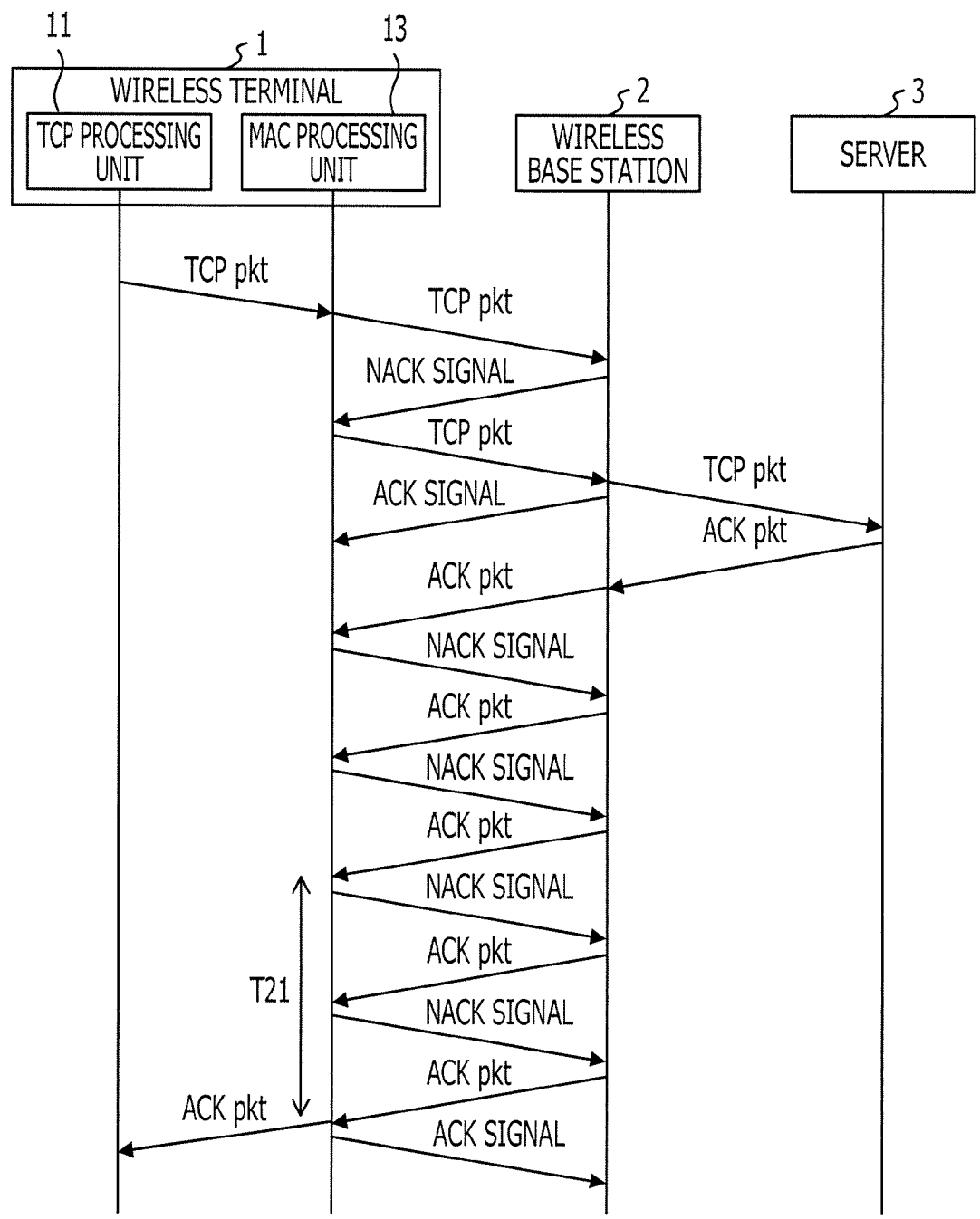
FIG. 15 illustrates behavior in transmission/reception of TCP packets with wireless ARQ control.
Figure 16:
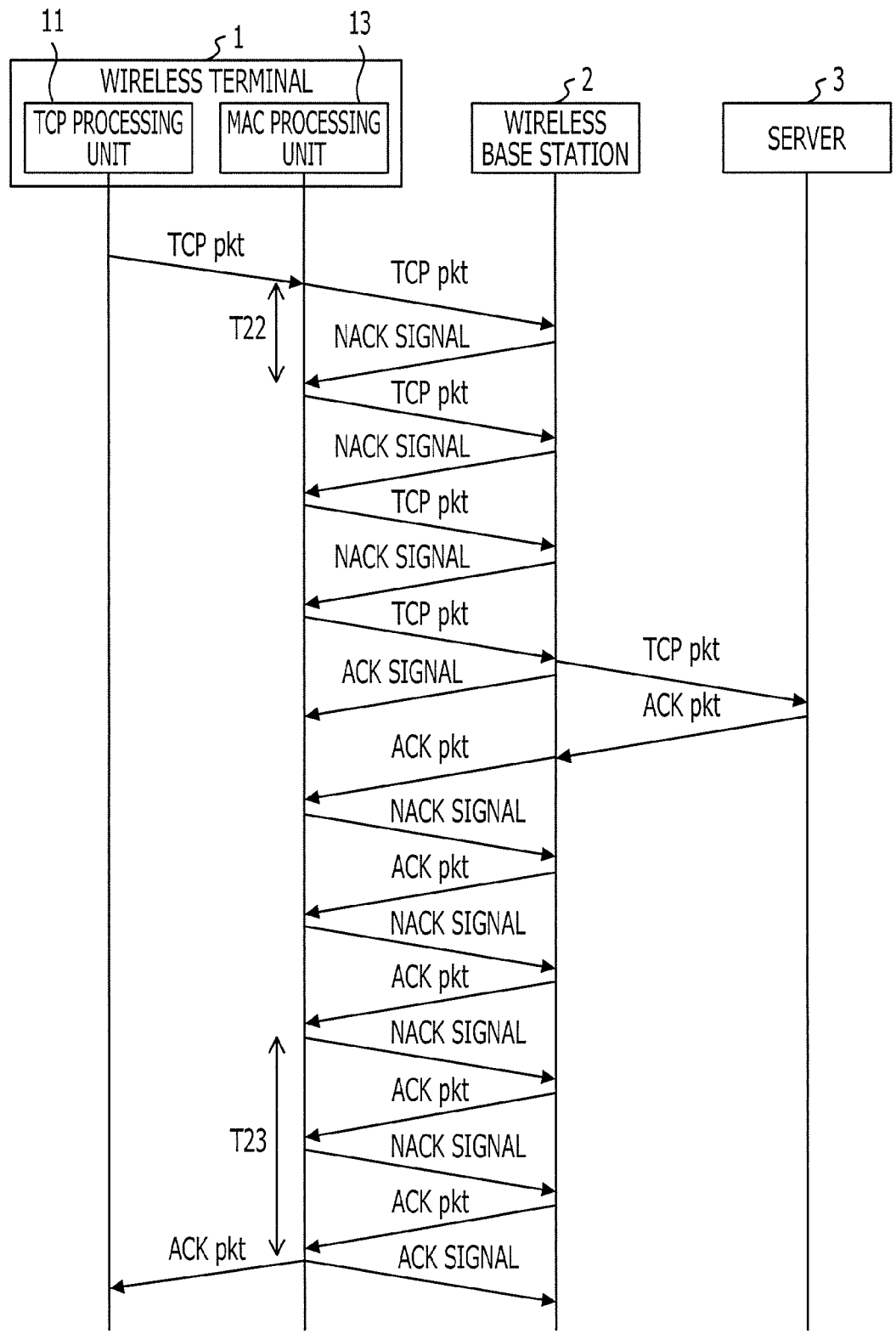
FIG. 16 illustrates behavior in transmission/reception of TCP packets with wireless ARQ control.

For example, let us consider a case where $Time_{ARQ\ 2}$ is obtained at the time of N=5. At this time, the link measurement unit 16 has to measure T21 in the case of FIG. 15. Also, the link measurement unit 16 has to measure a total of T22 and T23 in the case of FIG. 16. That is to say, the link measurement unit 16 permits up to two retransmissions in each of uplink and downlink, and measures time exceeding this, whereby $Time_{ARQ\ 2}$ may be obtained.

The wireless loss rate according to the second embodiment will be described. The link measurement unit 16 obtains $Prob_{ARQ\ N-1}$, $Prob_{ARQ\ N-2}$, ... $Prob_{ARQ\ 1}$, $Prob_{ARQ\ 0}$ (=$Prob_{ARQ\ OFF}$) as wireless loss rates. Here, $Prob_{ARQ\ i}$ ($0 \le i \le N-1$) correspond to packet loss rates that fail to be restored in the event that the maximum number of times of retransmission according to ARQ control is reduced to i times.

For example, let us consider a case where $Prob_{ARQ\ 2}$ is obtained at the time of N=5. At this time, the link measurement unit 16 obtains $Prob_{ARQ\ 2} = L2_{ARQ\ 2}/S + L3_{ARQ\ 2}/S$. Here, S is the number of times for the wireless terminal 1 of the wireless terminal 1 transmitting a TCP packet. $L2_{ARQ\ 2}$ is the number of times for the wireless terminal 1 receiving a NACK signal three (=i+1) times or more at the time of transmitting a TCP packet. $L3_{ARQ\ 2}$ is the number of times for the wireless terminal 1 transmitting a NACK signal three (=i+1) times or more at the time of receiving a TCP packet. The wireless terminal 1 may measure these $L2_{ARQ\ 2}$ and $L3_{ARQ\ 2}$, whereby $Prob_{ARQ\ 2}$ may be obtained.

Next, the time estimation unit 172 will be described. The time estimation unit 172 obtains estimated TCP RTT. First, the time estimation unit 172 obtains $present\_TCP\_RTT_{ARQ\ ON}$ which is the current TCP RTT obtained by the transport measurement unit 15. Also, the time estimation unit 172 obtains $Time_{ARQ\ i}$ ($0 \le i \le N-1$) which are the wireless delay time obtained by the link measurement unit 16. The time estimation unit 172 then obtains $estimated\_TCP\_RTT_{ARQ\ i} = present\_TCP\_RTT_{ARQ\ ON} - Time_{ARQ\ i}$ ($0 \le i \le N-1$), which are estimated TCP RTT.

The probability estimation unit 173 obtains estimated TCP loss rates. First, the probability estimation unit 173 obtains $present\_TCP\_Loss_{ARQ\ ON}$ which is the current TCP loss rate obtained by the transport measurement unit 15. Also, the probability estimation unit 173 obtains $Prob_{ARQ\ i}$ ($0 \le i \le N-1$) which are the wireless loss rates obtained by the link measurement unit 16. The probability estimation unit 173 then obtains $estimated\_TCP\_Loss_{ARQ\ i} = present\_TCP\_Loss_{ARQ\ ON} - Prob_{ARQ\ i}$ ($0 \le i\ N-1$), which are estimated TCP loss rates. The second derivation unit 174 obtains estimated TCP throughputs. First, the second derivation unit 174 obtains $estimated\_TCP\_RTT_{ARQ\ i}$ ($0 \le i \le N-1$) which are the estimated TCP RTT obtained by the time estimation unit 172. Also, second derivation unit 174 obtains $estimated\_TCP\_Loss_{ARQ\ i}$ ($0 \le i \le N-1$) which are the estimated TCP loss rates obtained by the probability estimation unit 173. The second derivation unit 174 then uses the obtained estimated TCP RU and TCP loss rates, and the data size B and TCP-specific parameter to obtain estimated TCP throughputs $estimated\_TCP\_TP_{ARQ\ i}$ ($0 \le i \le N-1$) based on Expression (1). Here, the data size B or TCP-specific parameter $\alpha$ may be obtained from the transport measurement unit 15 or TCP processing unit 11, or given values may be employed.

The determination unit 175 determines necessity of ARQ control from the current TCP throughput and estimated TCP throughputs. First, the determination unit 175 obtains the current TCP throughput $present\_TCP\_TP_{ARQ\ ON}$ from the first derivation unit 171. Also, the determination unit 175 obtains the estimated TCP throughputs $estimated\_TCP\_TP_{ARQ\ i}$ ($0 \le i \le N-1$) from the second derivation unit 174. The determination unit 175 then compares the current TCP throughput and each of the estimated TCP throughputs. If the current TCP throughput is the greatest, the determination unit 175 ends the processing. On the other hand, if the estimated TCP throughput $estimated\_TCP\_TP_{ARQ\ i}$ ($0 \le i \le N-1$) is the greatest, the determination unit 175 inputs a signal to change the maximum number of times of transmission of ARQ control to i times to the MAC processing unit 13. Also, if the estimated TCP throughput $estimated\_TCP\_TP_{ARQ\ 0}$ is the greatest, the determination unit 175 inputs a signal to set ARQ control to off to the MAC processing unit 13.

Figure 17:
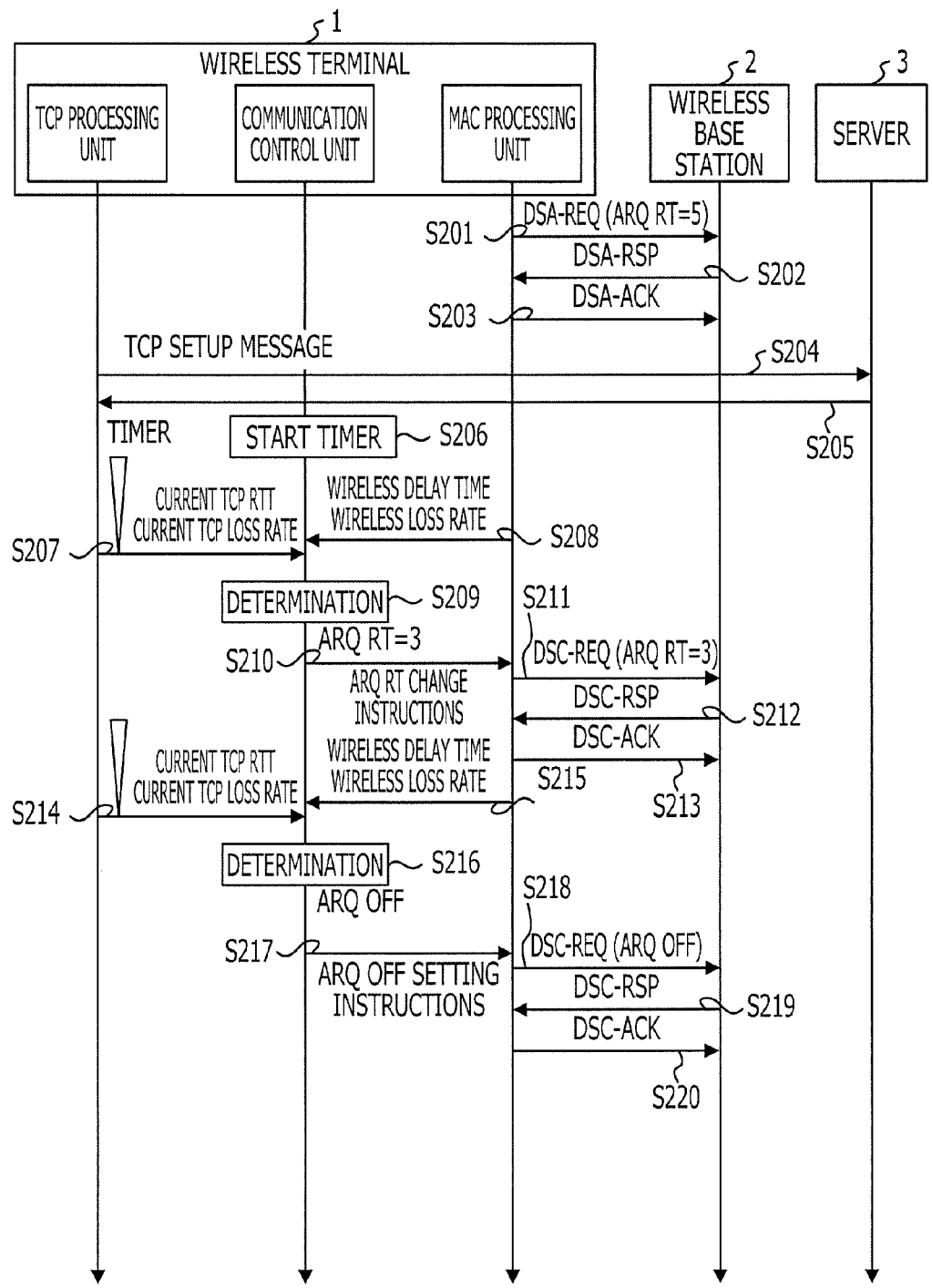
FIG. 17 illustrates an operation sequence in a communication system according to a second embodiment.

FIG. 17 illustrates an example of an operation sequence of a wireless system according to the second embodiment. Here, FIG. 17 will briefly be described mainly with a point different from FIG. 11. Note that, in FIG. 17, the maximum number of times of retransmission is represented as RT (ReTry).

With this example, at first, the wireless system is operated with the maximum number of times of retransmission of ARQ N=5 (S201 through S206). The determination unit 175 of the wireless terminal 1 determines, with the first determination, to change to the maximum number of times of retransmission of ARQ N=3 (S207 through S210). The MAC processing unit 13 of the wireless terminal 1 then transmits the DSC-REQ message to change the maximum number of times of transmission to the wireless base station 2 (S211 through S213). With the DSC-REQ message at this time, the maximum number of times of retransmission 3 after change is set to a ARQ_RETRY_TIMEOUT TLV field.

Also, the determination unit 175 of the wireless terminal 1 determines, with the second determination, to stop ARQ (S214 through S217). The MAC processing unit 13 of the wireless terminal 1 transmits the DSC-REQ message to stop counting of the maximum number of times of transmission to the wireless base station 2 (S218 through S220). With the DSC-REQ message at this time, 0 (ARQ OFF) is set to the ARQ Enable TLV field.

As described above, according to the communication system according to the second embodiment, TCP throughput after change is obtained without actually changing the maximum number of times of retransmission of ARQ with wireless communication. Therefore, a case where TCP throughput is further deteriorated may be avoided by changing the maximum number of times of retransmission of ARQ. That is to say, according to the communication system according to the second embodiment, change of the maximum number of times of retransmission of retransmission control may be carried out before change after confirming throughput after change.

[c] Third Embodiment

The first embodiment is to estimate throughput in the event of stopping ARQ at the time of carrying out ARQ at the wireless layer, and to estimate throughput in the event of starting ARQ at the time of stopping ARQ at the wireless layer. On the other hand, a third embodiment is to estimate throughput in the event of stopping FEC at the time of carrying out FEC at the wireless layer, and to estimate throughput in the event of starting FEC at the time of stopping FEC at the wireless layer.

Note that WiMAX which is wireless technology standards does not have an FEC independent function. Therefore, in order to use FEC with WiMAX, the above-mentioned HARQ has to be employed, or an FEC independent function has to be newly embedded. It goes without saying that the present embodiment is not restricted to WiMAX.

The third embodiment has many points common to the first embodiment. Hereafter, description will be made in the third embodiment with a point different from the first embodiment as the center.

Figure 18:
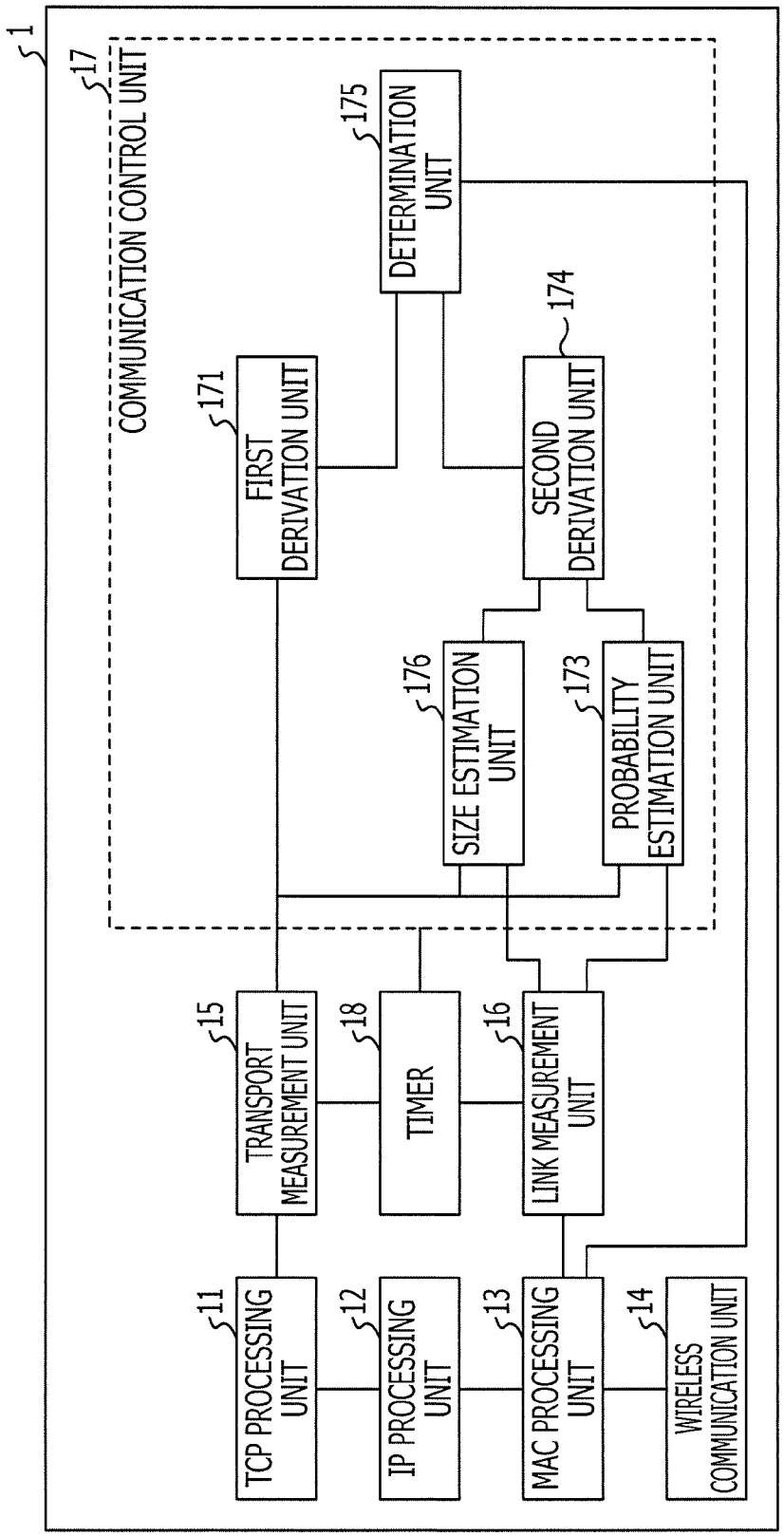
FIG. 18 illustrates a function configuration of a wireless terminal in a communication system according to a third embodiment.

FIG. 18 illustrates the function configuration of the wireless terminal 1 in a communication system according to the third embodiment. The wireless terminal 1 in FIG. 18 includes a size estimation unit 176 instead of the time estimation unit 172 in the wireless terminal 1 (FIG. 2) according to the first embodiment.

Also, with the third embodiment, the MAC processing unit 13 of the wireless terminal 1 and wireless base station 2 differs. Further, the processes of the transport measurement unit 15, link measurement unit 16, and communication control unit 17 (including the second derivation unit 174 and determination unit 175) differ from those in the first embodiment.

First, description will be made regarding the MAC processing unit 13 of the wireless terminal 1 and MAC processing unit 23 of the wireless base station 2 according to the third embodiment. The basic flow of transmission/reception of a wireless frame is the same as with the first embodiment. However, the MAC processing units 13 and 23 according to the third embodiment differ from those in the first embodiment in that FEC control is performed. Also, the MAC processing units 13 and 23 according to the third embodiment also differ from those in the first embodiment in that ARQ control does not necessarily have to be performed.

FEC is a technique to restore error data without performing retransmission by employing redundant data based on a given coding rate. The MAC processing unit 13 of the wireless terminal 1 transmits, at the time of transmitting data, the data by including redundant data in another frame beforehand. In the event that a transmission error has been detected at the MAC processing unit 23 of the wireless base station 2, data including the error is restored from redundant data. This is the same even when the transmission side and the reception side are switched.

FEC uses redundant data based on a given coding rate. Therefore, though there is an aspect where efficiency in data transmission deteriorates when carrying out FEC, retransmission does not have to be performed, whereby data transmission may rather be performed effectively when wireless quality is poor. That is to say, even in the event that a frame is readily damaged due to poor wireless quality, communication reliability over a wireless line may be secured up to a point by employing FEC.

The communication control unit 17 according to the third embodiment obtains present_TCP_TP$_{FEC\_ON}$ which is the current TCP throughput in the event that FEC control is on. Also, the communication control unit 17 estimates estimated_TCP_TP$_{FEC\_OFF}$ which is estimated TCP throughput in the event that FEC control is off.

TCP throughput is obtained by Expression (1). Here, RTT and TCP-specific parameter α in Expression (1) do not vary regardless of on/off of FEC control. However, the data size B and packet loss rate P in Expression (1) vary according to on/off of FEC control. Therefore, in order to estimate TCP throughput, B and P have to be estimated. However, estimation of P has to be performed in the same way as described in the first embodiment. Therefore, hereafter, description will be made regarding estimation of B which is the data size of a TCP packet.

The data size B of a TCP packet is determined by MSS (Maximum Segment Size) and FEC coding rate. MSS means the maximum data size that may be stored in one packet. Though the MSS of a TCP packet differs depending on the network at a lower layer, in general, the MSS is thousand through several thousands bytes or so, which is not so great. Therefore, the data sizes of most TCP packets may be assumed to be MSS. Accordingly, in the event that FEC control is off, the average of the data size B included in one TCP packet is generally equal to MSS.

On the other hand, the coding rate of FEC is assumed to be E. In the event that FEC control is on, the average of B becomes MSS×E bytes.

Based on the above-mentioned description, description will sequentially be made regarding the transport measurement unit 15, link measurement unit 16, size estimation unit 176, second derivation unit 174, and determination unit 175 of the wireless terminal 1 according to the third embodiment.

The transport measurement unit 15 measures the current TCP loss rate in the same way as with the first embodiment. The transport measurement unit 15 does not have to measure the current TCP RTT, which differs from the first embodiment.

The link measurement unit 16 monitors the MAC processing unit 13 to measure the wireless loss rate. However, the measurement method differs from that in the first embodiment. In the event that FEC is on, the link measurement unit 16 measures "a probability that a wireless frame has failed to be decoded without performing FEC processing by the MAC processing unit 13, and a wireless frame has been able to be decoded by performing FEC processing", as the wireless loss rate. Briefly speaking, this wireless loss rate corresponds to a probability that transmission/reception of a TCP packet will succeed using FEC control (if FEC is set to off, the worth of this probability becomes packet loss).

On the other hand, in the event that FEC is off, the link measurement unit 16 monitors the control service flow to measure the wireless loss rate. This measurement has to be performed based on the same concept as with the first embodiment. Note that the link measurement unit 16 does not have to measure the wireless delay time, which differs from the first embodiment.

The size estimation unit 176 estimates the data size B of a packet. In the event that FEC is on, the size estimation unit 176 obtains MSS from the TCP processing unit 11, and assumes that the estimated data size estimated_$TCP_{FEC\_OFF}$=MSS. On the other hand, in the event that FEC is off, the size estimation unit 176 obtains MSS from the TCP processing unit 11, and also obtains a wireless coding rate (FEC coding rate) E from the MAC processing unit 13. The size estimation unit 176 then computes the estimated data size estimated_$TCP_{FEC\_ON}$=MSS×E.

The second derivation unit 174 obtains an estimated TCP throughput. First, the second derivation unit 174 obtains estimated_$TCP\_Loss_{FEC\_ON}$ or estimated $TCP\_Loss_{FEC\_OFF}$ which is an estimated TCP loss rate obtained by the probability estimation unit 173. Also, the second derivation unit 174 obtains estimated_$TCP\_Size_{FEC\_ON}$ or estimated_$TCP\_Size_{FEC\_OFF}$ which is an estimated data size obtained by the size estimation unit 176. The second derivation unit 174 then uses the obtained estimated TCP loss rate and estimated data size, and TCP RTT and TCP-specific parameter to obtain estimated TCP throughput based on Expression (1). Here, with regard to this TCP RTT, the second derivation unit 174 may obtain TCP RTT from the transport measurement unit 15, or may regard this as a constant to employ a given value. Also, with regard to the TCP-specific parameter α, the second derivation unit 174 may obtain this from the TCP processing unit 11, or may use a given value.

The determination unit 175 determines necessity of FEC control from the current TCP throughput and estimated TCP throughput. First, the determination unit 175 obtains the current TCP throughput from the first derivation unit 171. Also, the determination unit 175 obtains the estimated TCP throughput from the second derivation unit 174. The determination unit 175 then compares the current TCP throughput and estimated TCP throughput. If the current TCP throughput is greater, the determination unit 175 ends the processing. On the other hand, if the estimated TCP throughput is greater, the determination unit 175 inputs a signal to switch on/off of FEC of a service flow to perform TCP communication to the MAC processing unit 13. That is to say, in the event that the estimated TCP throughput is greater and also FEC is on, the determination unit 175 inputs a signal to set FEC control to off to the MAC processing unit 13. Also, in the event that the estimated TCP throughput is greater and also FEC is off, the determination unit 175 inputs a signal to set FEC control to on to the MAC processing unit 13.

FIG. 19 illustrates an example of an operation sequence of the wireless system according to the third embodiment. Here, description will be made primarily regarding the points in which FIG. 19 differs from FIG. 11. With this example, at first, the wireless system is operated with FEC control being on (S401 through S406). The determination unit 175 of the wireless terminal 1 determines, with the first determination, to change FEC to off (S407 through S410). The MAC processing unit 13 of the wireless terminal 1 then transmits the DSC-REQ message to change FEC to off to the wireless base station 2 (S411 through S413). With the DSC-REQ message at this time, 0 (FEC OFF) is set to an FEC Enable TLV field.

Also, the determination unit 175 of the wireless terminal 1 determines, with the third determination, to change FEC to on (S417 through S420). The MAC processing unit 13 of the wireless terminal 1 transmits the DSC-REQ message to change FEC to on to the wireless base station 2 (S421 through S423). With the DSC-REQ message at this time, 1 (FEC ON) is set to the FEC Enable TLV field.

Description will be made regarding an example of a control message that the MAC processing unit 13 of the wireless terminal 1 and the MAC processing unit 23 of the wireless base station 2 transmit/receive in the third embodiment. Here, description will briefly be made with a point different from the control messages according to the first embodiment (FIGS. 13A through 14C).

FIG. 20 is an diagram for describing a DSA-REQ message according to the third embodiment. The DSA-REQ message according to the third embodiment may include an FEC Enable TLV field in FIG. 20 instead of or in addition to the ARQ Enable TLV field in the DSA-REQ message indicated in FIG. 13A. With the FEC Enable TLV field, on/off of FEC as to a service flow to be newly created is set.

Also, with the DSA-RSP message (FIG. 13B), DSC-REQ message (FIG. 14A), and DSC-RSP message (FIG. 14B) as well, the FEC Enable TLV field may be included therein in the same way as with the DSA-REQ message.

As described above, according to the communication system according to the third embodiment, TCP throughput while FEC is stopped is obtained without actually stopping FEC with wireless communication. Therefore, a case where TCP throughput is further deteriorated may be avoided by switching FEC from on to off. Also, according to the communication system according to the third embodiment, TCP throughput while FEC is carried out is obtained without actually carrying out FEC with wireless communication. Therefore, a case where TCP throughput is further deteriorated may be avoided by switching FEC from off to on. That is to say, according to the communication system according to the third embodiment, transition to stopping of error correction coding may be carried out before stopping after confirming throughput after stopping.

[d] Fourth Embodiment

The third embodiment is to estimate throughput in the event of stopping FEC at the time of carrying out FEC at the wireless layer, and to estimate throughput in the event of starting FEC at the time of stopping FEC at the wireless layer. On the other hand, a fourth embodiment is to estimate throughput in the event of changing the coding rate of FEC at the time of carrying out FEC based on a given coding rate.

The fourth embodiment has many points common to the third embodiment. Hereafter, description will be made in the fourth embodiment with a point different from the third embodiment as the center.

Though the function configuration of a wireless terminal 1 according to the fourth embodiment is the same as with the third embodiment, the processes of the link measurement unit 16, size estimation unit 176, probability estimation unit 173, second derivation unit 174, and determination unit 175 differ from those in the third embodiment. Hereafter, description will sequentially be made regarding these.

The link measurement unit 16 of the wireless terminal 1 monitors a wireless frame that a wireless processing unit transmits/receives. The link measurement unit 16 obtains the wireless loss rate during the monitoring period. With the fourth embodiment, the contents of the wireless loss rate differ from that in the third embodiment. Hereafter, let us say that a group made up of M coding rates that may be selected in FEC is $\{E_j | 0 \leq j \leq M\}$. Also, let us say that FEC is operated on, and the coding rate of FEC (wireless coding rate) is present_$E$=$E_p$.

The wireless loss rate according to the fourth embodiment will be described. The link measurement unit 16 obtains $\text{Prob}_{FEC\ M}, \text{Prob}_{FEC\ M-1}, \ldots \text{Prob}_{FEC\ 1}, \text{Prob}_{FEC\ 0}$ (=$\text{Prob}_{FEC\ OFF}$) as wire loss rates. Here, let us say that $\text{Prob}_{FEC\ j}=Q_j-Q_p\ (0 \leq j \leq M, j \neq p)$.

$Q_j$ is a probability to be estimated that in the event of carrying out FEC control of the wireless coding rate $E_j$, a wireless frame may correctly be decoded. $Q_p$ is a probability that a wireless frame may correctly be decoded according to FEC control of the current wireless coding rate $E_p$. Briefly speaking, this wireless loss rate $\text{Prob}_{FEC\ j}$ corresponds to a probability that transmission/reception failure of a wireless frame will be guided to success by the current coding $E_p$ with a case where the wireless coding rate of FEC control is switched (from $E_p$) to $E_j$ as a reference. That is to say, if the coding rate of FEC is switched, the worth of this probability becomes all packet loss.

Next, the size estimation unit 176 will be described. The size estimation unit 176 obtains an estimated data size. The size estimation unit 176 obtains MSS from the TCP processing unit 11, and also obtains wireless code rates $\{E_j|0 \leq j \leq M\}$ from the MAC processing unit 13. The size estimation unit 176 then computes estimated data sizes estimated_TCP_$\text{Size}_{FEC\ j}=\text{MSS} \times E_j\ (0 \leq j \leq M, j \neq p)$.

The probability estimation unit 173 obtains estimated TCP loss rates. First, the probability estimation unit 173 obtains present_TCP_Loss$_{FEC\ p}$ which is the current TCP loss rate obtained by the transport measurement unit 15. Also, the probability estimation unit 173 obtains $\text{Prob}_{FEC\ j}\ (0 \leq j \leq M, j \neq p)$ which are the wireless loss rates obtained by the link measurement unit 16. The probability estimation unit 173 obtains estimated_TCP_Loss$_{FEC\ j}$=present_TCP_Loss$_{FEC\ p}$+$\text{Prob}_{FEC\ 3}\ (0 \leq j \leq M, j \neq p)$ which are estimated TCP loss rates.

The second derivation unit 174 obtains estimated TCP throughputs. First, the second derivation unit 174 obtains estimated_TCP_Size$_{FEC\ j}$ $(0 \leq j \leq M, j \neq p)$ which are the estimated data sizes obtained by the size estimation unit 176. Also, the second derivation unit 174 obtains estimated_TCP_Loss$_{FEC\ j}$ $(0 \leq j \leq M, j \neq p)$ which are the estimated TCP loss rates obtained by the probability estimation unit 173. The second derivation unit 174 then uses the obtained estimated data sizes and TCP loss rates, and TCP RTT and TCP-specific parameter to obtain estimated TCP throughputs estimated_TCP_TP$_{FEC\ j}$ $(0 \leq j \leq M, j \neq p)$ based on Expression (1). Here, with regard to this TCP UT, the second derivation unit 174 may obtain TCP RTT from the transport measurement unit 15, or may regard this as a constant to employ a given value. Also, with regard to the TCP-specific parameter α, the second derivation unit 174 may obtain this from the TCP processing unit 11, or may use a given value.

The determination unit 175 determines necessity of FEC control from the current TCP throughput and estimated TCP throughputs. First, the determination unit 175 obtains the current TCP throughput present_TCP_TP$_{FEC\ p}$ from the first derivation unit 171. Also, the determination unit 175 obtains the estimated TCP throughputs estimated_TCP_TP$_{FEC\ j}$ $(0 \leq j \leq M, j \neq p)$ from the second derivation unit 174. The determination unit 175 then compares the current TCP throughput and each of the estimated TCP throughputs. If the current TCP throughput is the greatest, the determination unit 175 ends the processing. On the other hand, if the estimated TCP throughput estimated_TCP_TP$_{FEC\ j}$ $(0 \leq j \leq M, j \neq p)$ is the greatest, the determination unit 175 inputs a signal to change the wireless coding rate to $E_j$ to the MAC processing unit 13. Also, if the estimated TCP throughput estimated_TCP_ TP$_{FEC\ 0}$ is the greatest, the determination unit 175 inputs a signal to set FEC control to off to the MAC processing unit 13.

Figure 21:
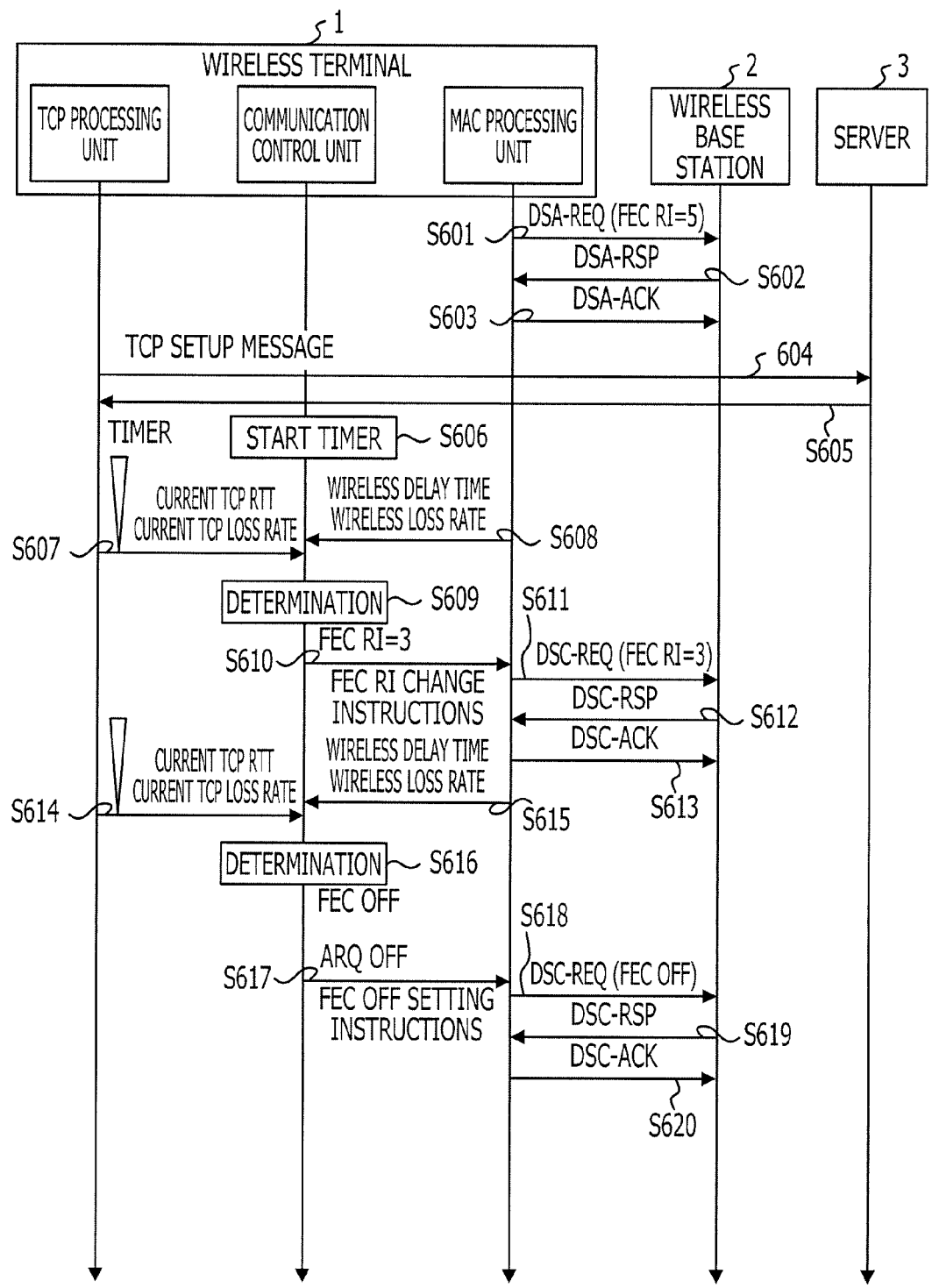
FIG. 21 illustrates an operation sequence in a communication system according to a fourth embodiment.

FIG. 21 illustrates an example of an operation sequence of the wireless system according to the fourth embodiment. Also, examples of wireless coding rates that may be employed in FEC control are indicated in FIG. 22. Now, FIG. 21 will be described mainly with a point different from FIG. 19. Note that, in FIG. 21, the index of a wireless coding rate is represented as RI (Rate Index).

With this example, at first, the wireless system is operated with an FEC wireless coding rate $E_5=188/268$. The determination unit 175 of the wireless terminal 1 determines, with the first determination, to change to a wireless coding rate $E_3=188/236$. The MAC processing unit 13 of the wireless terminal 1 transmits the DSC-REQ message to stop FEC to the wireless base station 2, to change the wireless coding rate. With the DSC-REQ message at this time, the wireless coding rate after change is specified to an FEC_ENCODE_PARAM TLV field indicated in FIG.

Also, the determination unit 175 of the wireless terminal 1 determines, with the second determination, to stop FEC. The MAC processing unit 13 of the wireless terminal 1 transmits the DSC-REQ message to stop FEC to the wireless base station 2. With the DSC-REQ message at this time, 0 (FEC OFF) is set to the FEC Enable TLV field.

As described above, according to the communication system according to the fourth embodiment, TCP throughput after change is obtained without actually changing the coding rate of FEC with wireless communication. Therefore, a case where TCP throughput is further deteriorated may be avoided by changing the coding rate of FEC. That is to say, according to the communication system according to the fourth embodiment, change of the coding rate of error correction coding may be carried out before change after confirming throughput after change.

[e] Other Embodiments

The above-mentioned first through fourth embodiments may be combined as appropriate.

For example, the first and third embodiments are combined, whereby switching with ARQ and FEC being combined may be performed, such as switching from ARQ on and also FEC on to ARQ off and also FEC on, or the like. Thus, the optimal throughput with on/off of each of ARQ and FEC being combined may be secured.

Further, for example, the second and fourth embodiments are combined, whereby switching with the maximum number of times of retransmission of ARQ and the wireless coding rate of FEC being combined may be performed, such as switching from the maximum number of times of retransmission of ARQ=five times and also FEC wireless coding rate=188/268 to the maximum number of times of retransmission of ARQ=three times and also FEC wireless coding rate=188/252, or the like. Thus, the optimal throughput with the maximum number of times of retransmission of ARQ and the wireless coding rate of FEC being combined may be secured.

Hereafter, variations in the above-mentioned embodiments will be described.

With the above-mentioned embodiments, the transport measurement unit 15 and link measurement unit 16 and so forth start processing with the timer 18 to which a given expiration period has been set expiring as a trigger. As for this expiration period, a fixed value may be employed, or a different value for each application to be processed at a service flow may be employed.

For example, the wireless terminal 1 includes a time table as indicated in FIG. 23, and the timer 18 may reference this time table to change the expiration period for each application to be processed at a service flow. An application to be processed at a service flow may be identified with a port number within a TCP header appended to a TCP packet that flows into the service flow.

A different expiration period is set for each application, whereby ARQ/FEC control with immediacy may be performed as to an application with relatively high immediacy, for example, such as HTTP, and consequently, influence due to deterioration in throughput may be minimized. Also, with regard to an application with relatively low immediacy such as FTP, determinations may be performed leaving space therebetween, whereby processing load due to ARQ/FEC control may be suppressed.

Also, an arrangement may be made wherein the determination unit 175 or the like start processing without employing the timer 18. For example, the transport measurement unit 15 or link measurement unit 16 or the like may start processing with the current TCP throughput reaching a given value or less (e.g., reaching 5% or less of a line band) as a trigger. Thus, ARQ/FEC control may be performed in quick response to increase in TCP throughput.

Also, with the above embodiments, though absolute TCP throughput is obtained based on Expression (1), relative throughput may be obtained. For example, with the first embodiment, as described above, only RTT and P are variables of the parameters in Expression (1), and B and α are constants. Accordingly, with the first embodiment, an arrangement may be made wherein R'=1/(RTT×P) is obtained as relative throughput, and determination is made based on the size thereof, without using Expression (1). It goes without saying that determination may be made based on the size of R"=RTT×P. Thus, computation amount at the time of obtaining throughput may be reduced. With regard to the other embodiments as well, in the same way, determination based on relative throughput may be performed.

Also, with the second embodiment, though the maximum number of times of retransmission of ARQ is determined so as to optimize TCP throughput, optimization may not necessarily be performed. For example, the maximum number of times of retransmission of ARQ of which the throughput is the second or thereafter may be selected, using other given conditions. As an example, in the event that when setting the maximum number of times of retransmission so as to optimize throughput, the wireless terminal 1 and wireless base station 2 are estimated to be overloaded, the maximum number of times of retransmission of ARQ of which the throughput is the second or thereafter may be selected.

Also, with the above-mentioned embodiments, the communication system including the wireless terminal 1 and wireless base station 2 is operated with the wireless terminal 1 side playing a leading role. However, embodiments of the present disclosure are not restricted to this. For example, the communication system including the wireless terminal 1 and wireless base station 2 may be operated with the wireless base station 2 side playing a leading role. In this case, the operations of the wireless terminal 1 and wireless base station 2 according to the above-mentioned embodiments are just switched, and accordingly, detailed description will be omitted.

Further, though the above-mentioned embodiments are communication systems where the wireless terminal 1 performs wireless communication, embodiments of the present disclosure are not restricted to this. For example, the present disclosure may also be applied to a case where a wire terminal performs wired communication.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication device comprising:
    an antenna configured to perform a wireless communication; and
    a processor configured to perform a wireless communication protocol for the wireless communication, the wireless communication protocol including an upper layer and a lower layer;
    wherein the processor is configured
    to estimate, based on a round trip time measured at the upper layer in case of carrying out a retransmission control at the lower layer and a time taking for retransmissions at the lower layer, a first estimated round trip time in case of not carrying out the retransmission control,
    to estimate, based on the number of times of packet loss at the upper layer in case of carrying out the retransmission control at the lower layer, and the number of times of successful transmission at the upper layer being recovered by the retransmission control, a first estimated packet loss rate in case of not carrying out the retransmission control, and
    to obtain, based on the first estimated round trip time and the first estimated packet loss rate, a first estimated throughput in case of not carrying out the retransmission control.

2. The communication device according to the claim 1, wherein the processor is further configured to determine whether to disable the retransmission control or not, based on a throughput in case of carrying out the retransmission control and the first estimated throughput.

3. The communication device according to the claim 1, wherein the processor is further configured
    to estimate, based on a round trip time measured at the upper layer when not carrying out the retransmission control at the lower layer, and a time estimated to be taking for retransmissions at the lower layer, a second estimated round trip time in case of carrying out the retransmission control,
    to estimate, based on the number of times of packet loss at the upper layer in case of not carrying out the retransmission control at the lower layer, and the number of times for successful transmission at the upper layer being recovered by the retransmission control, a second estimated packet loss rate in case of carrying out the retransmission control, and
    to obtain a second estimated throughput in case of carrying out the retransmission control based on the second estimated round trip time and the second estimated packet loss rate.

4. The communication device according to the claim 3, wherein the processor is further configured to determine whether to carry out the retransmission control or not, based on a throughput in case of not carrying out the retransmission control and the second estimated throughput.

5. A communication device comprising:
an antenna configured to perform a wireless communication; and
a processor configured to perform a wireless communication protocol for the wireless communication, the wireless communication protocol including an upper layer and a lower layer;
wherein the processor is configured
to estimate, based on a round trip time measured at the upper layer when carrying out the retransmission control at the lower layer with the first maximum number of retransmission retries set to a certain value, and a time taking for retransmissions at the lower layer, an estimated round trip time for the second maximum number of retransmission retries,
to estimate, based on the number of times of packet loss at the upper layer in case of carrying out the retransmission control with the first maximum number of retransmission retries, and the number of times for successful transmission at the upper layer with the retransmission control at the lower layer, an estimated packet loss rate for the second maximum number of retransmission retries, and
to obtain an estimated throughput for the second maximum number of retransmission retries based on the estimated round trip time and the estimated packet loss rate.

6. A communication device comprising:
an antenna configured to perform a wireless communication; and
a processor configured perform a wireless communication protocol for the wireless communication, the wireless communication protocol including an upper layer and a lower layer;
wherein the processor is configured
to estimate, based on a data size at the upper layer in case of carrying out error correction coding at the lower layer, a first estimated data size at the upper layer in case of not carrying out the error correction coding,
to estimate, based on the number of times of packet loss at the upper layer in case of carrying out the error correction coding and the number of times for successful transmission at the upper layer being recovered by the error correction coding, a first estimated packet loss rate in case of not carrying out the error correction coding, and
to obtain a first estimated throughput in case of not carrying out the error correction coding based on the first estimated data size and the first estimated packet loss rate.

7. The communication device according to the claim 6, wherein the processor is further configured to determine whether to disable the error correction coding or not, based on a throughput in case of carrying out the error correction coding, and the first estimated throughput in case of not carrying out the error correction coding.

8. The communication device according to the claim 6, wherein the processor is further configured
to estimate, based on a data size of the upper layer in case of not carrying out the error correction coding at the lower layer, a second estimated data size at the upper layer in case of carrying out the error correction coding,
to estimate a second estimated packet loss rate in case of carrying out the error correction coding based on the number of times of packet loss at the upper layer in case of not carrying out the error correction coding, and the number of times for successful transmission at the upper layer being recovered by the error correction coding, and
to obtain a second estimated throughput in case of carrying out the error correction coding based on the second estimated data size and the second estimated packet loss rate.

9. The communication device according to the claim 8, wherein the processor is further configured to determine whether to carry out the error correction coding or not, based on a throughput in case of not carrying out the error correction coding, and the second estimated throughput in case of carrying out the error correction coding.

10. A communication method comprising:
performing the wireless communication protocol including an upper layer and a lower layer;
estimating, based on a round trip time measured at the upper layer in case of carrying out a retransmission control at the lower layer and a time taking for retransmissions at the lower layer, a first estimated round trip time in case of not carrying out the retransmission control,
estimating, based on the number of times of packet loss at the upper layer in case of carrying out the retransmission control at the lower layer, and the number of times of successful transmission at the upper layer being recovered by the retransmission control, a first estimated packet loss rate in case of not carrying out the retransmission control, and
obtaining, based on the first estimated round trip time and the first estimated packet loss rate, a first estimated throughput in case of not carrying out the retransmission control.

11. The communication method according to the claim 10, further comprising:
determining whether to disable the retransmission control or not, based on a throughput in case of carrying out the retransmission control and the first estimated throughput.

12. The communication method according to the claim 10, further comprising:
estimating, based on a round trip time measured at the upper layer when not carrying out the retransmission control at the lower layer, and a time estimated to be taking for retransmissions at the lower layer, a second estimated round trip time in case of carrying out the retransmission control,
estimating, based on the number of times of packet loss at the upper layer in case of not carrying out the retransmission control at the lower layer, and the number of times for successful transmission at the upper layer being recovered by the retransmission control, a second estimated packet loss rate in case of carrying out the retransmission control, and
obtaining a second estimated throughput in case of carrying out the retransmission control based on the second estimated round trip time and the second estimated packet loss rate.

13. The communication method according to the claim 12, further comprising:
determining whether to carry out the retransmission control or not, based on a throughput in case of not carrying out the retransmission control and the second estimated throughput.

* * * * *